United States Patent
Pragada et al.

(10) Patent No.: US 10,187,840 B2
(45) Date of Patent: Jan. 22, 2019

(54) METHOD AND APPARATUS FOR SELECTING A ROUTING PATH IN A MESH NETWORK

(71) Applicant: IDAC HOLDINGS, INC., Wilmington, DE (US)

(72) Inventors: Ravikumar V. Pragada, Collegeville, PA (US); Yugeswar Deenoo, King of Prussia, PA (US); Onur Sahin, Brooklyn, NY (US); Arnab Roy, East Norriton, PA (US); Philip J. Pietraski, Jericho, NY (US)

(73) Assignee: IDAC HOLDINGS, INC., Wilmington, DE (US)

( * ) Notice: Subject to any disclaimer, the term of this patent is extended or adjusted under 35 U.S.C. 154(b) by 125 days.

(21) Appl. No.: 14/766,370

(22) PCT Filed: Feb. 6, 2014

(86) PCT No.: PCT/US2014/015129
§ 371 (c)(1),
(2) Date: Aug. 6, 2015

(87) PCT Pub. No.: WO2014/124153
PCT Pub. Date: Aug. 14, 2014

(65) Prior Publication Data
US 2015/0382275 A1    Dec. 31, 2015

Related U.S. Application Data

(60) Provisional application No. 61/761,980, filed on Feb. 7, 2013, provisional application No. 61/874,784, filed on Sep. 6, 2013.

(51) Int. Cl.
*H04W 40/16* (2009.01)
*H04W 40/12* (2009.01)
(Continued)

(52) U.S. Cl.
CPC ........ *H04W 40/16* (2013.01); *H04W 28/021* (2013.01); *H04W 40/12* (2013.01);
(Continued)

(58) Field of Classification Search
CPC ......... H04L 41/12; H04L 45/02; H04L 45/00; H04L 45/04; H04L 41/04
See application file for complete search history.

(56) References Cited

U.S. PATENT DOCUMENTS 7,633,940 B1 * 12/2009 Singh ...................... H04L 45/12
370/237
7,697,505 B2 * 4/2010 White ...................... H04L 45/00
370/217

(Continued)

OTHER PUBLICATIONS

IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band, IEEE P802.11ad-2012 (Oct. 2012).

(Continued)

*Primary Examiner* — Zhiren Qin
(74) *Attorney, Agent, or Firm* — Volpe and Koenig, P.C.

(57) ABSTRACT

A method and apparatus for joint routing and distributed scheduling in a directional mesh network includes receiving feedback for multiple candidate paths from at least one neighbor node, Semi-static and instantaneous metrics are determined based upon the received feedback. Routing from a first node to a destination node is determined based upon the semi-static and instantaneous metrics, and a transmission is routed in accordance with the determined route from the first node to the destination node.

11 Claims, 19 Drawing Sheets

(51) Int. Cl.
*H04W 28/02* (2009.01)
*H04W 40/24* (2009.01)
*H04W 72/12* (2009.01)
*H04W 84/18* (2009.01)

(52) U.S. Cl.
CPC ..... *H04W 40/246* (2013.01); *H04W 72/1221* (2013.01); *H04W 72/1231* (2013.01); *H04W 40/24* (2013.01); *H04W 84/18* (2013.01); *Y02D 70/00* (2018.01); *Y02D 70/1226* (2018.01); *Y02D 70/1242* (2018.01); *Y02D 70/1244* (2018.01); *Y02D 70/1246* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/164* (2018.01); *Y02D 70/22* (2018.01); *Y02D 70/23* (2018.01); *Y02D 70/34* (2018.01)

(56) References Cited

U.S. PATENT DOCUMENTS

| | | | | |
|---|---|---|---|---|
| 8,774,100 | B2* | 7/2014 | Xiaoben | H04W 16/04 370/329 |
| 2006/0268700 | A1* | 11/2006 | Clark | H04L 29/06027 370/230 |
| 2007/0264933 | A1* | 11/2007 | Kang | H04W 40/36 455/13.1 |
| 2008/0205291 | A1* | 8/2008 | Li | H04L 47/722 370/254 |
| 2009/0005052 | A1* | 1/2009 | Abusch-Magder | H04W 24/02 455/446 |
| 2010/0189084 | A1* | 7/2010 | Chen | H04W 84/045 370/338 |
| 2011/0103322 | A1* | 5/2011 | Rhee | H04L 45/72 370/329 |
| 2011/0225311 | A1 | 9/2011 | Liu et al. | |
| 2012/0026899 | A1* | 2/2012 | Lee | H04L 45/22 370/252 |
| 2013/0279410 | A1* | 10/2013 | Dublin, III | H04W 40/02 370/328 |
| 2013/0288737 | A1* | 10/2013 | Nentwig | H04W 52/243 455/522 |

OTHER PUBLICATIONS

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2012 (Mar. 29, 2012).

Draft Standard for Information technology—Telecommunications and information exchange between systems—Local and metropolitan area networks—Specific requirements; Part 11: Wireless LAN Medium Access Control (MAC) and Physical Layer (PHY) Specifications, Amendment 10: Mesh Networking, IEEE Std.802.11s/D10.0 (Mar. 2011).

Neely, "Optimal Backpressure Routing for Wireless Networks with Multi-Receiver Diversity," 2006 40th Annual Conference on Information Sciences and Systems, pp. 18-25 (Mar. 2006).

* cited by examiner

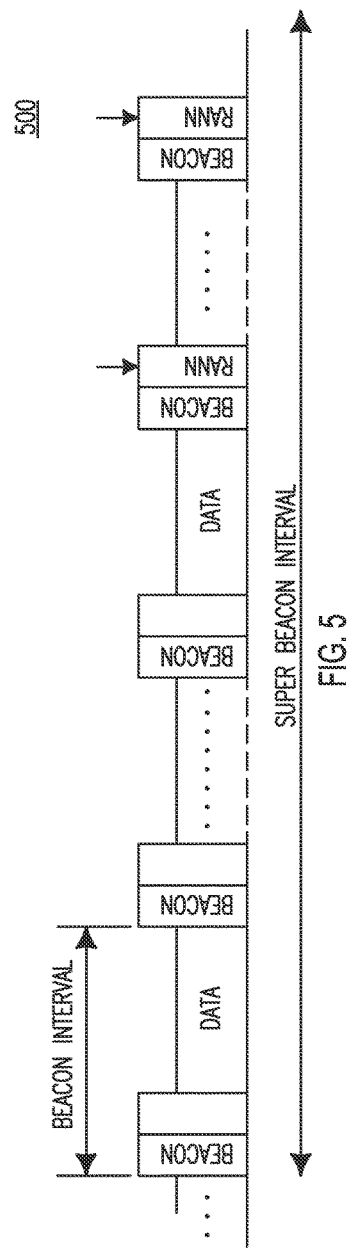

| FRAME CONTROL | SOURCE ADD. | DEST. ADD. | NODE1 ADD. | NODE2 ADD. | NODE3 ADD. | NODE4 ADD. | DOWNSTREAM | | UPSTREAM | | SEQUENCE NUMBER | QoS CLASS |
|---|---|---|---|---|---|---|---|---|---|---|---|---|
| | | | | | | | ALM | ABO | ALM | ABO | | |
| 710 | 721 | 722 | 723 | 724 | 725 | 726 | 731 | 732 | 733 | 734 | 740 | 750 |

Address field: 720; Metric: 730; 700

FIG. 7

| FRAME CONTROL | SOURCE ADD. | DEST. ADD. | NODE1 ADD. | NODE2 ADD. | NODE3 ADD. | NODE4 ADD. | DOWNSTREAM | | SEQUENCE NUMBER | QoS CLASS |
|---|---|---|---|---|---|---|---|---|---|---|
| | | | | | | | ALM | ABO | | |
| 810 | 820 | 830 | 840 | 850 | 860 | 870 | 881 | 882 | 890 | 895 |

Metric: 880; 800

FIG. 8

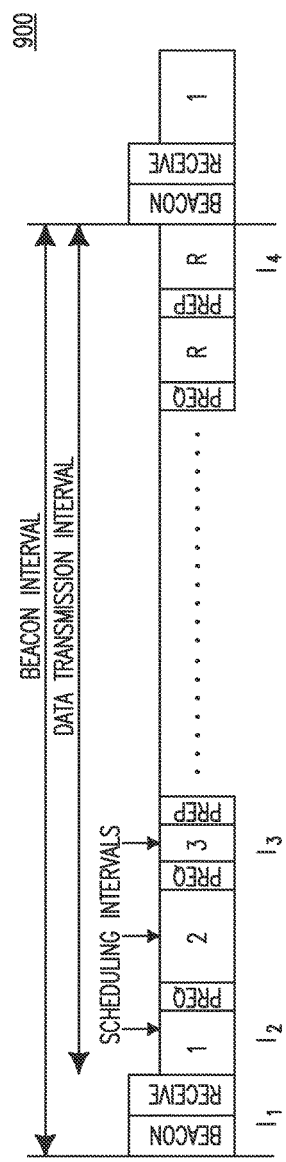
FIG. 9
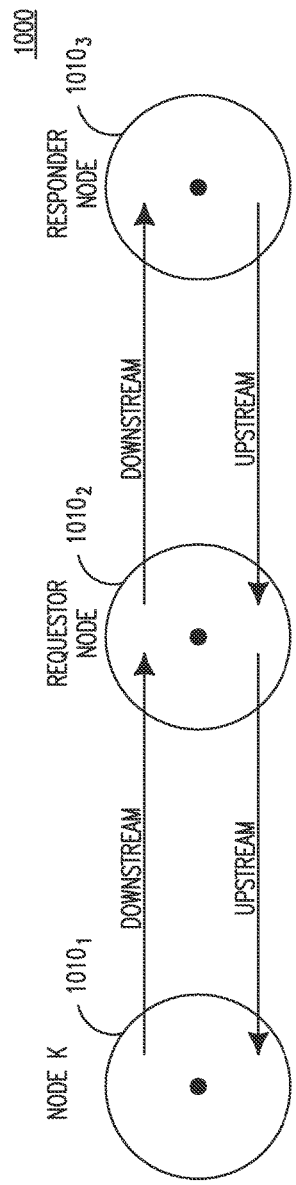
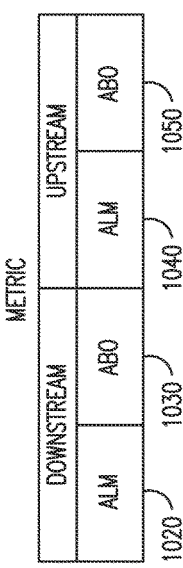
FIG. 10

| FRAME CONTROL | SOURCE ADD. | DEST. ADD. | TX ADD. | RX ADD. | NEIGHBOR NODE IDs | SEQUENCE NUMBER |
|---|---|---|---|---|---|---|
| 1310 | 1320 | 1330 | 1340 | 1350 | 1360 | 1370 |

METHOD AND APPARATUS FOR SELECTING A ROUTING PATH IN A MESH NETWORK

CROSS REFERENCE TO RELATED APPLICATIONS

This application claims the benefit of U.S. Provisional Patent Application No. 61/761,980 filed Feb. 7, 2013 and U.S. Provisional Patent Application No. 61/874,784 filed Sep. 6, 2013, the contents of which are hereby incorporated by reference herein.

BACKGROUND

The millimeter wave (mmW) frequencies provide huge amount of spectrum. The 60 GHz unlicensed spectrum alone is about 7 GHz bandwidth (depending on country) and there is potentially much more that may be available either as licensed, lightly licensed, or unlicensed spectrum. In order to close the link budget for mmWs, highly directional antennas are needed and are becoming practical (e.g., wireless high definition (HD) devices). There is a synergetic effect to be exploited at higher frequencies which is not possible below sub-6 GHz and there is a potential of much greater spatial reuse. Higher gain antennas that are needed for millimeter wave communications have an associated benefit of greater directionality which reduces the interference seen by unintended receivers. At mmW frequencies, large carrier bandwidths are achievable with comparably low fractional bandwidths. This enables single radio solutions capable of addressing large amount of spectrum. Utilizing mmW frequencies may also lead to lower power consumption because of high directional antennas and by trading bandwidth for power (Shannon's law). However, there are many associated challenges. The mmW carriers have near optical properties with high penetration losses, high reflection losses, and little diffraction, leading to line of sight (LOS) dominated coverage. Millimeter wave frequencies are also subject to a host of propagation challenges (especially high oxygen absorption concern for 60 GHz band).

SUMMARY

A method and apparatus for joint routing and distributed scheduling in a directional mesh network is disclosed. The method includes receiving feedback for multiple candidate paths from at least one neighbor node, Semi-static and instantaneous metrics are determined based upon the received feedback. Routing from a first node to a destination node is determined based upon the semi-static and instantaneous metrics, and a transmission is routed in accordance with the determined route from the first node to the destination node.

BRIEF DESCRIPTION OF THE DRAWINGS

A more detailed understanding may be had from the following description, given by way of example in conjunction with the accompanying drawings wherein:

FIG. 3 shows an example format of a root announcement link state matrix (RALM) packet;

FIG. 4 shows an example format of a root announcement (RANN) packet;

FIG. 5 shows RANN dissemination during the ghost beacon interval for semi-static metrics;

FIG. 7 shows an example format of a path request (PREQ) packet;

FIG. 8 shows an example format of a path reply (PREP) packet;

FIG. 9 shows a PREQ and PREP frame scheduling in the beacon interval;

FIG. 10 shows an example diagram of a flow direction and updating of a metric field of the PREQ frame by a requestor node;

FIG. 13 shows an example format for a generic flooding frame transmitted by each node to convey neighbor node IDs to a dedicated node;

DETAILED DESCRIPTION

Figure 1A:
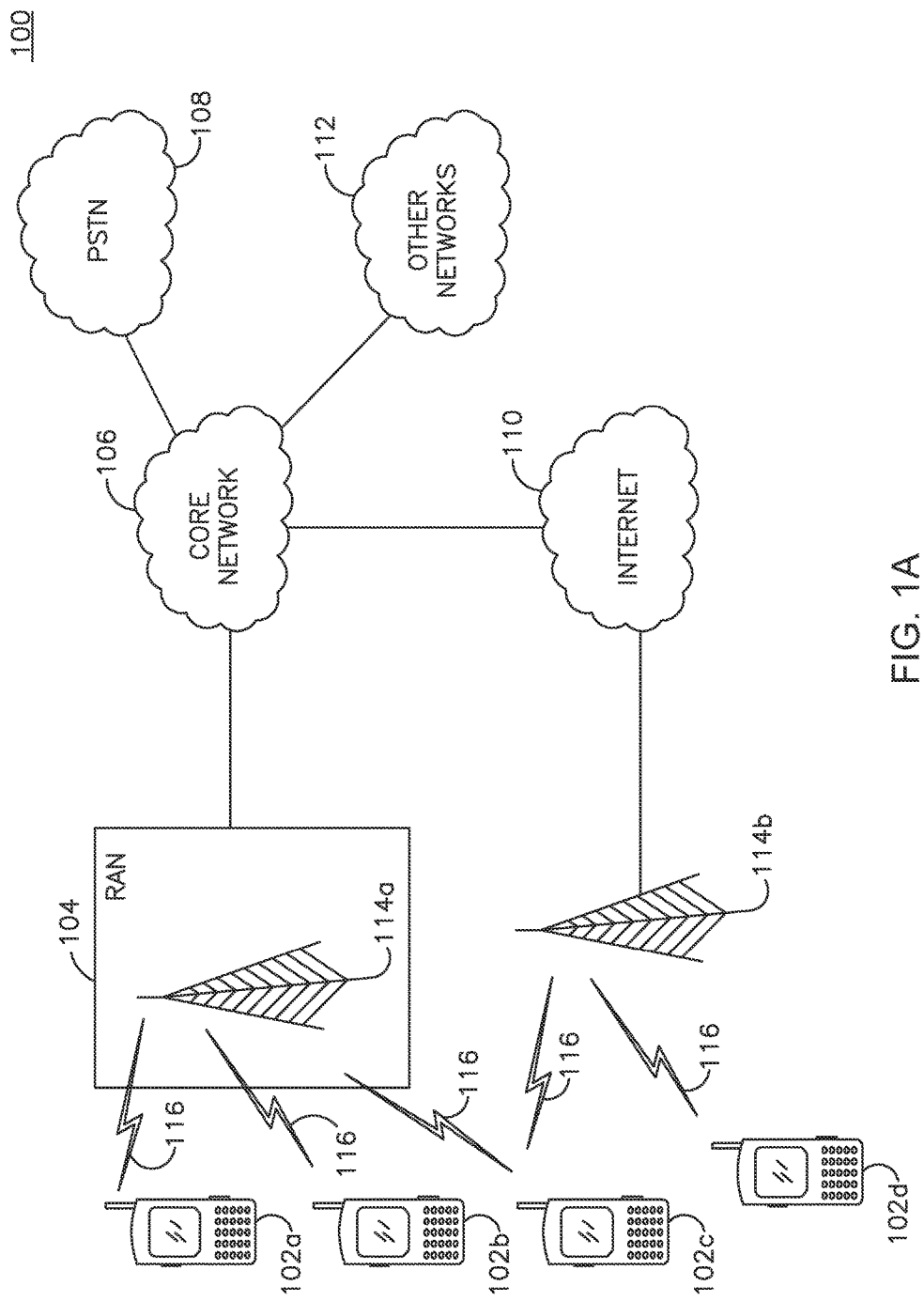
FIG. 1A is an example system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple-output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
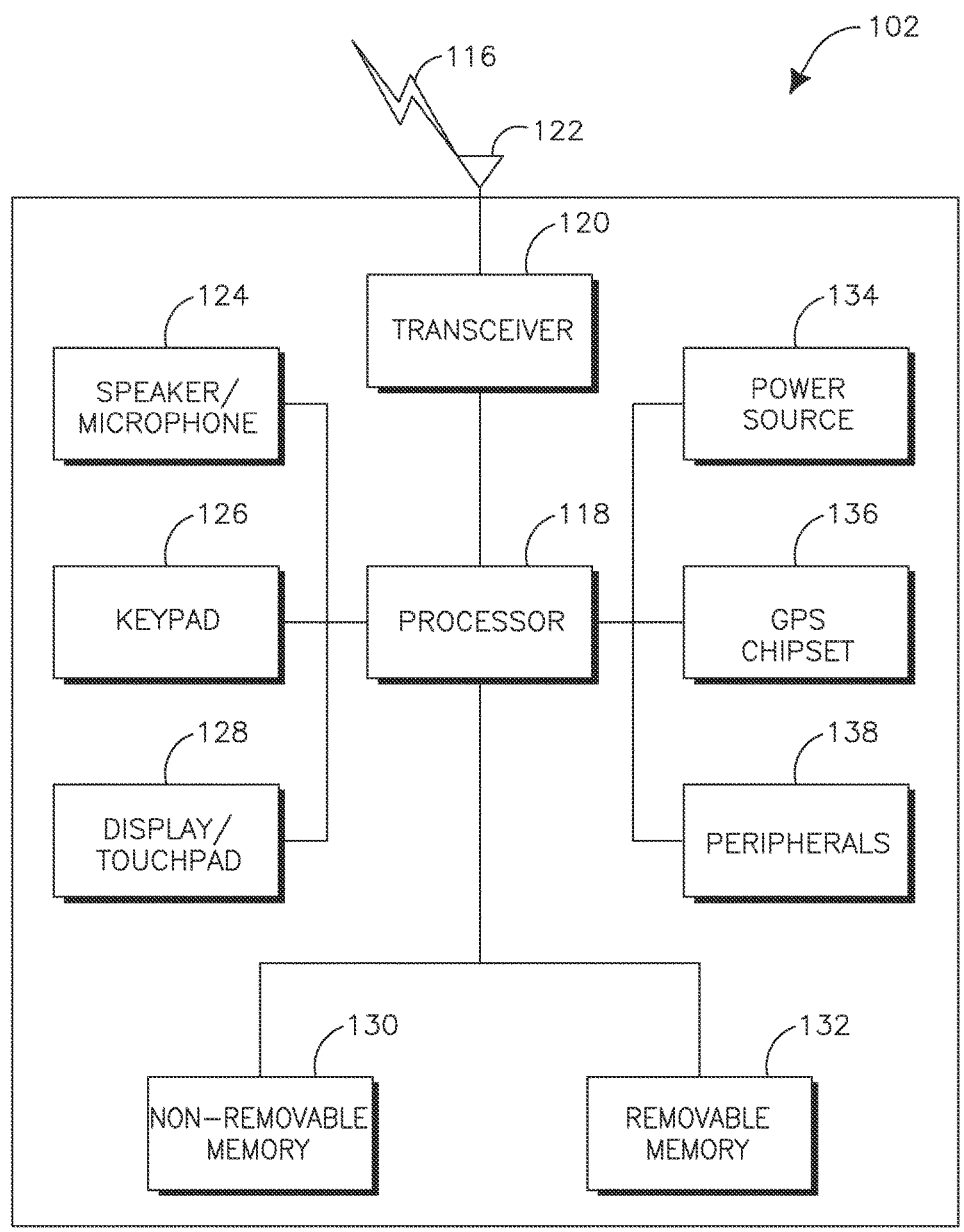
FIG. 1B is an example system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any subcombination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
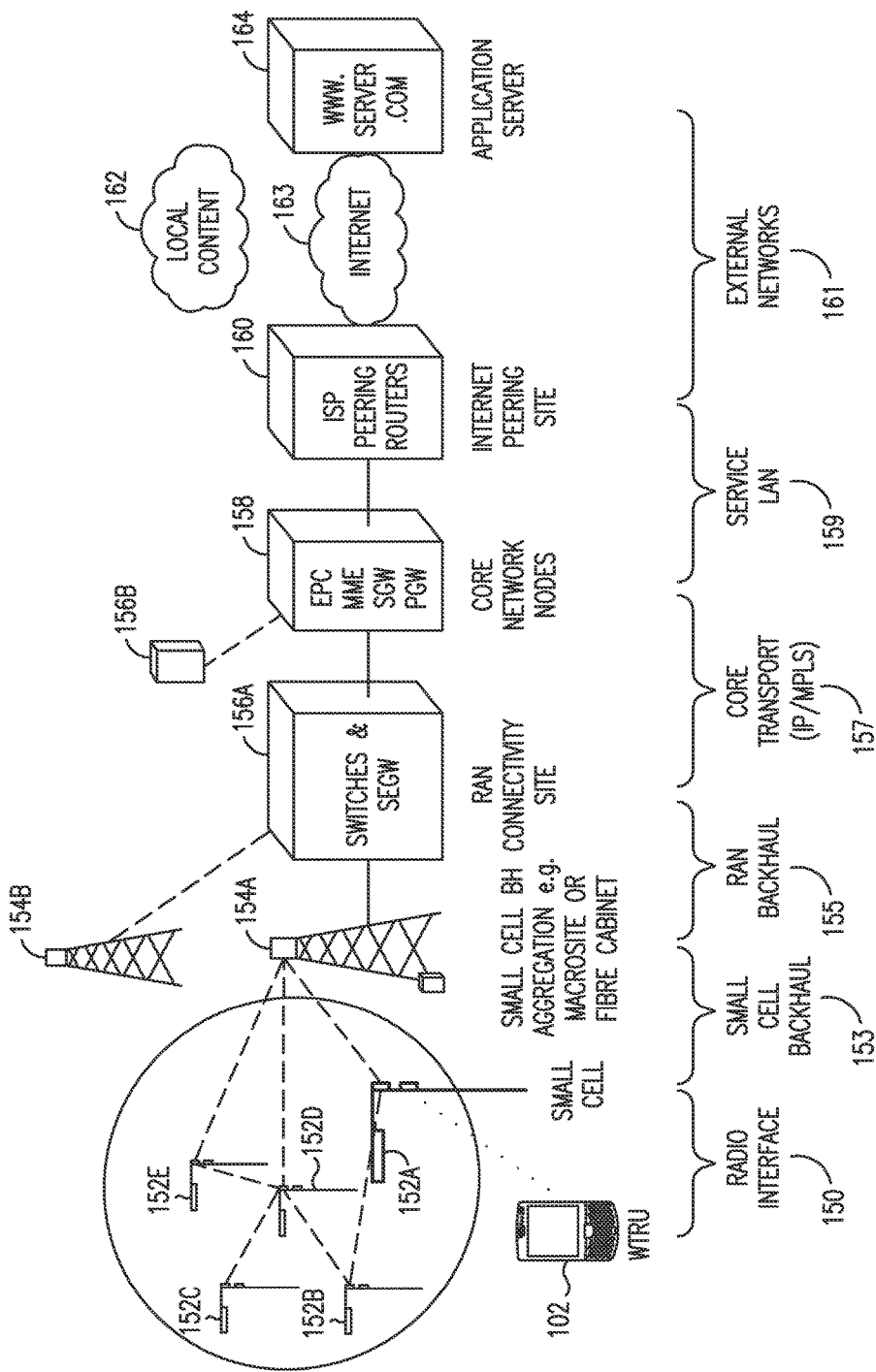
FIG. 1C is an example system diagram of a small cell backhaul in an end-to-end mobile network infrastructure.

FIG. 1C is an example system diagram of a small cell backhaul in an end-to-end mobile network infrastructure according to an embodiment. A set of small cell (SC) nodes 152a, 152b, 152c, 152d, and 152e and aggregation points 154a and 154b interconnected via directional millimeter wave (mmW) wireless links may comprise a "directional-mesh" network and provide backhaul connectivity. For example, WTRU 102 may connect via the radio interface 150 to the small cell backhaul 153 via small cell node 152a and aggregation point 154a. In this example, aggregation point 154a provides WTRU 102 access via the RAN backhaul 155 to a RAN connectivity site 156a. WTRU 102 therefore has access to the core network nodes 158, (e.g., MME, SGW, PGW), via the core transport 157 and to ISP 160 via the service LAN 159. WTRU 102 also has access to external networks 161, including but not limited to local content 162, the Internet 163, and application server 164. It should be noted that for purposes of example, the number of SC nodes 152 shown are five, however, any number of nodes 152 may be included in the set of SC nodes 152.

Figure 1D:
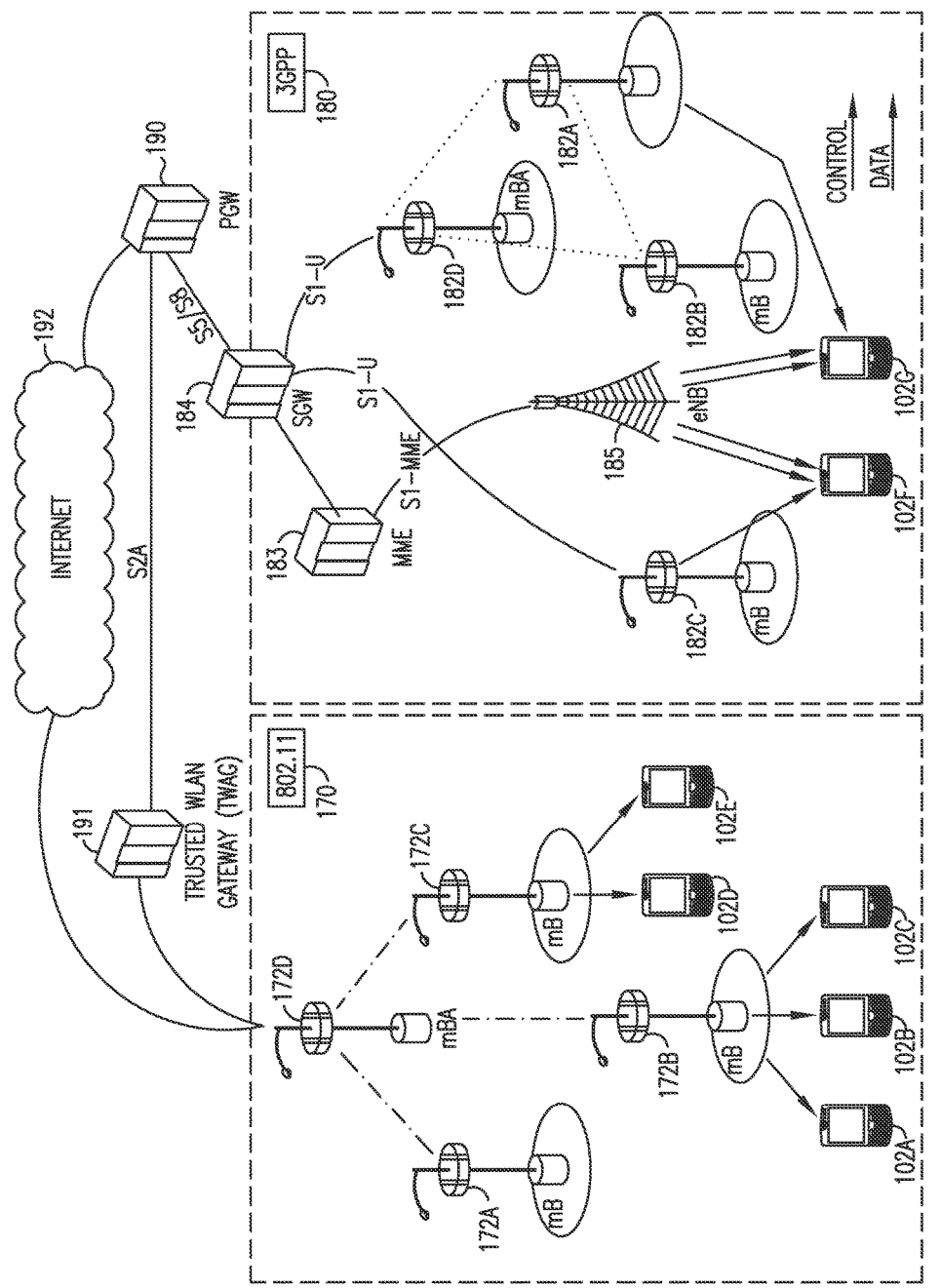
FIG. 1D is an example system diagram of a mmW backhaul applied to both a 3GPP cellular network and a non-3GPP network access infrastructure.

FIG. 1D is an example system diagram of a mmW backhaul applied to both a 3GPP cellular network and a non-3GPP network access infrastructure according to an embodiment. In this example, the non-3GPP network is IEEE 802.11 based. WTRUs 102a, 102b, 102c, 102d, and 102e may have access via millimeter wave base stations (mBs) 172a, 172b, and 172c in an 802.11 network 170 to a millimeter wave base station aggregator (mBA) 172d. The mBA 172d may provide access to external networks such as the Internet 192 and to the cellular network via trusted WLAN gateway (TWAG) 191.

Also, in this example, WTRUs 102f and 102g in the 3GPP network 180 may have access via mB 182c to mobility management entity (MME) 183 and serving gateway (SGW) 184, which may provide access to public data network gateway (PGW) 190 and the Internet 192.

WTRUs 102f and 102g may also have access via mBs 182a and 182b via mBA 182d to SGW 184, which may provide access to public data network gateway (PGW) 190 and the Internet 192.

WTRUs 102f and 102g may also have access via evolved Node B (eNB) 185 to mobility management entity (MME) 183 and SGW 184, which may provide access to public data network gateway (PGW) 190 and the Internet 192.

As shown in the examples of FIG. 1C and FIG. 1D, wireless mesh networks (WMNs) operating at mmW frequencies may be used, for example, to serve as backhaul networks for cellular or WLAN SCs such as those based on, for example, LTE or IEEE 802.11. An mmW directional mesh network may be an economical solution to provide backhaul connectivity to several cheaply deployed SCs. Directional links using highly directional antennas may be used to close the link budget at mmW frequencies. A directional-mesh network may also provide a flexible topology by requiring Line-Of-Sight (LOS) requirements only with immediate neighbors as opposed to an aggregation point. A directional-mesh network may provide easy scalability in that new nodes may be added with minimal network planning. A directional-mesh network may provide robustness in redundancy provided by multiple connectivity paths between mesh-nodes. A directional-mesh network may be configured with fully distributed scheduled, multi-hop and time division multiple access (TDMA) based directional mesh MAC features to ensure fast scheduling and short queue times.

Embodiments are disclosed for wireless mesh networks (WMNs) operating in mmW frequencies. An example application may be backhaul network for cellular or WLAN small cells (SCs) such as those based on Long Term Evolution (LTE), IEEE 802.11, or other standards. An mmW directional mesh network may be an attractive economical solution to provide backhaul connectivity to several small cells. Directional links utilizing highly directional antennas may be used to close the link budget at mmW frequencies. The backhaul network may include a set of small-cell nodes and aggregation points interconnected via directional mmW wireless links, resulting in a directional mesh network.

Traditionally, the back-pressure-based routing algorithms are shown to have good properties when it comes to maximizing the overall network throughput and reducing congestion in the network. However, the conventional back-pressure-based algorithm is not built to take care of interference, quality of service (QoS), latency/delay constraints, or the like. Choosing nodes with lower queue backlogs might result in sub-optimal paths from a delay perspective.

Wireless communication at millimeter wave frequencies allows use of high gain antennas due to small wavelengths. This enables the transmitted power to be concentrated in the direction of the intended receiver. The receiver may also use directional antennas for reception. This spatial containment of the signals not only allows longer communication ranges but also allows multiple spatially separated transceivers to operate simultaneously in sharing the medium. On the other hand, traditional multi-hop mesh networks are generally limited in throughput due to channel access constraints resulting from omni-directional transmission. Therefore, the resulting network throughput of a directional mesh can be potentially much larger due to efficient spatial reuse.

While the back-pressure-based routing algorithm may lead to maximum network throughput, it is not built to take care of interference, QoS, latency or delay constraints. In one embodiment, a two phase scheme may be implemented such that any routing protocol may be used as a first stage and a dynamic back-pressure based forwarding may be used as a second stage.

Path selection mechanisms in the wireless mesh network may depend on the information collected in the network such as wireless medium condition, the traffic status per node, etc. On the other hand, various packet classes, (e.g., voice, data, best effort, etc.), are defined to support QoS requirements of each packet. In one embodiment, path selection may consider the QoS requirements of the packets as well as the state of the wireless links between the nodes.

TABLE 1

| | |
|---|---|
| Interference to the neighbor nodes | Semi-static (per beacon interval (0.5 sec.)) |
| Buffer status (per QoS Class) | Frequently (per TTI (sub-1 ms)) |
| Delay per node (per QoS Class) | Frequently (per subframe (1 ms)) |
| Air-time link metric | Semi-static (per beacon interval (0.5 sec.)) |
| Link diversity | Semi-static (determined at the end node) |

Table 1 shows example metrics that may be used in the path selection algorithm and the expected periodicity of change in their values. These metrics may be used in determining the path between the source and destination nodes, (the nodes that transmits and receives a packet at a given time), and also how often these decisions are performed.

The metric associated with the interference to the neighbor nodes is denoted by $\text{Int}_{ij}^k$. This interference metric indicates how much interference Node i would create to Node k if the routing decision at Node i selects Node j as the next hop in the path. Even though a particular hop, (e.g., Node i-Node j), has substantially good channel quality as well as delay performance, selecting that hop might create excessive interference to other neighbor nodes, Node k in this case. Therefore, a new metric denoted as $\text{Int}_{ij}^k$ may be used as a metric in routing path decision.

This interference metric may be obtained in semi-static fashion during interference measurement campaign. For example, in an interference measurement campaign, each node may identify how much interference it observes during the transmission of all neighboring nodes. After identifying the interferer nodes as well as the observed interference power level, the interfered node may inform the interferer nodes by sending a measurement report. Then, each node may identify to which nodes they create interference as well as the power level of interference created by it. This information, which is incorporated in the metric $Int_{ij}^k$, may be used in the path selection decision.

The air-time link metric provides semi-static information regarding the link capacities of the nodes and may be given as follows:

$$c_a = \left[O + \frac{B_t}{r}\right]\frac{1}{1-e_f} \quad \text{Equation (1)}$$

where O is a channel access overhead including frame headers, training sequences, access protocol frames, etc. (depending on physical layer), $B_t$ is the test frame length in bits (constant), r is the transmission data rate in Mb/s or the test frame size Bt, $e_f$ is the test frame error/loss rate for Bt.

Link diversity metric, denoted by $P_{d,nD}$, is calculated at the end node which obtains multiple candidate paths to the destination. This metric determines the connectivity of next hop neighbor $n_D$ to the destination node, which indicates how many diverse paths this particular next hop provides towards destination in case it is selected to forward packets. This metric is calculated each time a broadcast, (e.g., path request (PREQ) packet), is received from the root node, which may happen semi-statically and in the order of air-time link metric. The details in determining $P_{d,nD}$ with respect to each neighbor and how this metric is used in the aggregate metric determination and candidate path selection is explained in detail below.

Buffer status is denoted as Bac and is given per access category (QoS class), for example, voice, data, best effort, etc. Bac depends on the channel scheduling and may vary at every transmission and reception opportunity, and therefore is quite dynamic.

Delay per node and access category, denoted as Bac, shows the time passed between the transmission and reception of the QoS class packets or the time that a packet spends in the buffer of the node. In one embodiment, a scheduler may assign a higher priority to the packets which are closer to the deadline by checking their time to live (TTL) field. The delay per node may be related to the number of packets that are close to deadline TTL. The link selection may try to avoid or manage the nodes with high number of non-scheduled, (e.g. close to deadline TTL) packets.

In the embodiments explained below, one or multiple QoS metrics may be used in routing path selection. For example, for a semi-static path selection protocol, air-time link metric may be considered as an input. Even though delay and buffer status metrics change very frequently with respect to path selection, average values of such metrics may be used in QoS aware path selection. For each QoS class, various combinations of these metrics may be used to determine the candidate paths. Denote $B_{ac,i}^{av}$, and $\delta_{ac,i}^{av}$ the average of the buffer status and delay, respectively, for Node i for access category traffic (e.g., voice, data, best effort, et.), and denote $c_{a,ij}$ the airtime link metric between Nodes i and j. An aggregated metric may be expressed as follows:

$$M_{ac,ij} = f_{ac}(Int_{ij}^k, c_{a,ij}, B_{ac,i}^{av}, \delta_{ac,i}^{av}), \quad \text{Equation (2)}$$

which is a function of semi-static and averaged inputs in the network. For each access category, $f_{ac}$ may be different. For instance, for voice communication, the function may provide some knowledge regarding the latency whereas for data packets, throughput may be quantified.

In one embodiment, link state based path selection may be performed in directional mesh networks. In this embodiment, a two-stage end-to-end packet forwarding protocol may be implemented. In the first stage, using the semi-static metrics such as airtime link metric and/or averaged metrics, (e.g., delay, buffer status in Table 1), the nodes obtain the link-state matrix of the cluster by utilizing a link state routing algorithm. In the second stage, packet scheduling is performed where the transmitting node makes the scheduling decision based on the packet QoS class (QCI) as well as the candidate paths obtained from the first stage.

Figure 2B:
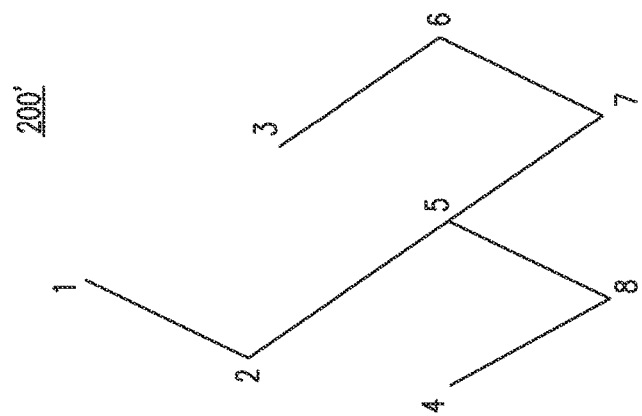
FIGS. 2A and 2B show an example cluster of mesh nodes connected to a fiber point of presence (PoP) and a spanning-tree for the network.
Figure 2A:
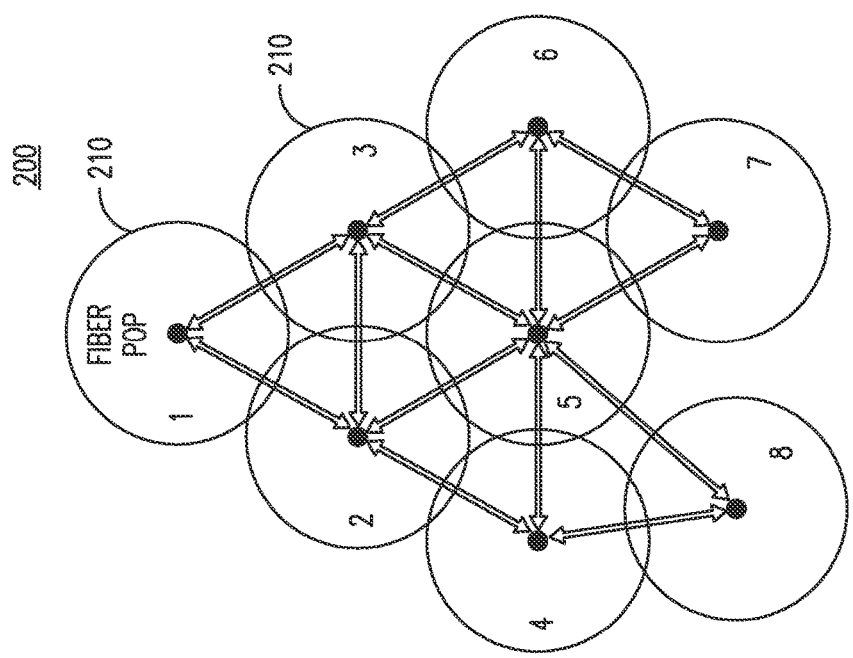

FIGS. 2A and 2B show an example cluster 200 and 200', respectively, of mesh nodes 210 connected to a fiber point of presence (PoP) and a spanning-tree for the network.

For the path selection between source and destination nodes, each node obtains the link-state matrix of the network. The link-state matrix is N×N matrix (N=8 in FIG. 2A) and each entry, (i,j), i,j=1, . . . , 8 denotes the $M_{ac,ij}$ metric given in equation (2) for the link between $Node_i$ and $Node_j$. It should be noted that $M_{ac,ij}$ carries the metric for various access categories such as voice and data and may take different values for the same link. The control packet that conveys the metric between the nodes (i,j) to the whole network is denoted as root announcement link state matrix (RALM).

FIG. 3 shows an example format 300 of the RALM packet, which includes a Frame Control field 310, Duration field 320 (which is the time it takes to transmit the packet in multiples of, e.g., 32 microseconds), Link ID field 330, Source ID field 340, Destination ID field 350, time to live (TTL) field 360, Metric field 370 and frame check sequence (FCS) field 380. The Link ID field 330 of the RALM packet is the indicator of the particular link. The source and destination IDs 340 and 350, respectively, indicate the nodes this information is transported. The metric field 370 carries the $M_{ac,ij}$ metrics of (i,j) which may be measured by a test packet or data packets.

Dissemination of the RALM packet for the link (i,j) may follow any generic link-state routing algorithm. Considering the relatively small size of the cluster, a pre-determined schedule may be used to disseminate the metric of the link (i,j) in the whole network.

A connectivity table may be used in establishing this pre-determined scheduling decision. A connectivity table denotes the neighbors of each node, and its size and entries may be updated once a new node is added to the network or when a link failure occurs between any neighboring nodes. Table 2 shows an example of the connectivity table for nodes 1-4. In Table 2, "1" denotes connection, and "0" denotes no connection. Due to the static nature of this information, this information may be generated and flooded into the network. Using the connectivity table, a pre-determined schedule may be utilized to convey the metric(s) to all nodes in the cluster.

TABLE 2

|        | Node 1 | Node 2 | Node 3 | Node 4 |
|--------|--------|--------|--------|--------|
| Node 1 | 0      | 1      | 1      | 0      |
| Node 2 | 0      | 0      | 1      | 1      |
| Node 3 | 1      | 1      | 0      | 0      |
| Node 4 | 0      | 1      | 0      | 0      |

A relatively straightforward scheduling protocol is given as follows. A node sends test or data packets to its neighbors (e.g., sequentially, for example, Node 1 to Node 2, then Node 1 to Node 3, etc.). Each receiving node calculates the aggregated metric Mac and generates the RALM packet.

The RALM packet may be transmitted by each node sequentially by traversing the spanning-tree, for example given in FIG. 2B. The spanning-tree traverses each node once (i.e., no loops) and therefore may ensure the transmission of the RALM packet to each node. Since the path-loss may be different bi-directionally, in order to obtain the MAC in both directions, the spanning tree in reverse direction may be used. For simplicity, one directional metric aggregation will be explained herein.

As an example, from FIG. 2A, a schedule for dissemination of some of the Mac,ij (using RALM) may be as follows:

For $M_{ac,12}$ schedule: (1,2)→(2,5)→(5,8)→(8,4)→(5,7)→(7,6)→(6,3);

For $M_{ac,25}$, schedule; (2,5)→(5,8)→(8,4)→(5,7)→(7,6)→(6,3)→(2,1);

For $M_{ac,58}$, schedule: (5,8)→(5,2)→(2,1)→(8,4)→(5,7)→(7,6)→(6,3);

For $M_{ac,48}$, schedule: (4,8)→(8,5)→(5,2)→(2,1)→(5,7)→(7,6)→(6,3).

The RALM packet carries semi-static $M_{ac,ij}$ metric information that contains the air-time link metric as well as averaged buffer status and delay time per access category, or the like. The RALM packet corresponding to each link (i,j), i,j=1, ... N, may be transmitted over scheduling regions that are 0.5 ms apart. Each RALM packet may be piggybacked to the data packets for the corresponding transmitting and receiving nodes in order to limit the throughput reduction due to the overhead associated with transmitting the packet.

The RALM scheduling in the above example may be mapped to the data scheduling that takes place in data transmission interval (DTI) of the mesh superframe. More specifically, for each scheduling region (which is 0.5 ms duration), the RALM packet may be piggybacked to the data packets that align with the scheduling order of the RALM packets. Table 3 shows an example piggyback mechanism of RALM packets for the metrics $M_{ac12}$ and $M_{ac25}$ (denoted as RALM12 and RALM25, respectively).

TABLE 3

| Link | 1 | 2 | 3 | 4 | 5 | 6 | 7 | 8 | 9 |
|---|---|---|---|---|---|---|---|---|---|
| (1,2) | Ctrl | | | Data/RALM12 | | | | | |
| (2,5) | | Ctrl | | | Data/RALM12/RALM25 | Data | Data | | |
| (5,8) | | | Ctrl | | | | | Data/RALM12/RALM25 | Data |
| (8,4) | | | Ctrl | | Data | Data | Data | Data | Data/RALM12/RALM25 |
| (5,7) | Ctrl | | | Data | Data | | | | |
| (7,6) | Ctrl | | | Data | | | | | |
| (6,3) | | Ctrl | | | Data | Data | Data | | |

In the example above, the scheduling of these RALM packets may be given as follows: $M_{ac,12}$: (1,2)→(2,5)→(5,8)→(8,4)→(5,7)→(7,6)→(6,3), $M_{ac,25}$: (2,5) (5,8) (8,4)→(5,7)→(7,6)→(6,3) (2,1). During the data transmission period (denoted in Table 3 as 4-9), RALM12 packet may be piggybacked to the data packets scheduled between the nodes (1,2),(2,5),(5,8),(8,4) whereas RALM25 may be piggybacked to (2,5),(5,8),(8,4) transmission opportunities. The remaining schedules in the RALM transmission, e.g., (5,7)→(7,6)→(6,3) for RALM12 and (5,7)→(7,6)→(6,3) (1,2) for RALM25 may be piggybacked in the following data region.

By obtaining the RALM packets from each node in the network, the nodes are able to create the link state matrix as follows:

$$\begin{array}{c} \\ \text{Node 1} \\ \text{Node 2} \\ \text{Node 3} \\ \vdots \\ \text{Node } N \end{array} \begin{bmatrix} \text{Node} & \text{Node} & \text{Node} & & \text{Node} \\ 1 & 2 & 3 & \ldots & N \\ & M_{ac,12} & M_{ac,13} & & M_{ac,1N} \\ M_{ac,21} & & M_{ac,23} & & M_{ac,2N} \\ \ldots & \ldots & \ldots & \ldots \\ \\ \ldots & \ldots & \ldots & \ldots \end{bmatrix}.$$

With the link state matrix available, each node may cast multiple candidate paths to any destination in the network. As an example, assume that Node 7 in FIG. 2A wishes to obtain multiple candidates end-to-end paths to Fiber PoP. Out of many possible candidate paths, 2 of these may be given by 7-6-3-1 with end-to-end metric $\{M_{ac,76}, M_{ac,63}, M_{ac,31}\}$ and 7-5-2-1 with metric $\{M_{ac,75}, M_{ac,52}, M_{ac,21}\}$.

In an alternative embodiment, path selection protocol may be separated from per node scheduling scheme. This embodiment may bring the benefit of optimizing two less-complex protocols instead of joint link selection and scheduling protocol with relatively high complexity. Path selection protocol in this case determines which next hop neighbor to forward the packet in order to reach a desired destination, while scheduling selects the appropriate time-slot to perform this operation.

The distance vector class routing algorithms may be used to provide a path selection mechanism in the network. The distance vector path selection mechanism has considerably less overhead compared with the link-state path selection protocol disclosed above, which provides a more dynamic path selection update mechanism.

The distance vector link selection protocol may be differentiated between root-to-leaf traffic and leaf-to-root traffic. Hereafter, the leaf-to-root traffic protocol will be considered, which may be generalized to root-to-leaf or leaf-to-leaf route selection.

The root node (fiber PoP) may periodically flood root announcement (RANN) control packet to its neighbors. FIG. 4 shows an example format 400 of the RANN packet. The RANN packet may contain a frame control field 410, Duration field 420, Source ID field 430, Destination ID field 440, Transmit (TX) ID field 450, Receive (RX) ID field 460, TTL field 470, Metric field 480, and Source Sequence Number field 490. The source ID (PoP), the destination ID and the IDs of the intermediate nodes (TX ID and RX ID) may be contained in their respective fields. The metric field 480 provides the aggregated metrics of the nodes traversed in the network without explicitly stating per link metric information. Hence, the ultimate destination, upon receiving the RANN packet, obtains the aggregated metric to the PoP along with the ID of the neighbor nodes this packet is received from.

The neighbors that receive the RANN packet update the metric content depending on their links to the originator as well as the other metrics of interest such as buffer status, per node delay as given in Table 1. After updating the metric, the neighbor nodes also flood the packet to their neighbors besides the one they received the RANN packet from. The metric is the aggregated value of all metrics corresponding to the other links/hops in the path. Hence, it gives an end-to-end aggregated metric value of the path.

The ultimate destination node receives multiple RANN packets with different metrics associated with each packet. Hence, the destination node is able to identify multiple candidate paths with different metrics whereas it knows which next hop the packet should be forwarded. As opposed to link-state algorithm disclosed above, the destination node in this protocol has the aggregated metric of the end-to-end link.

The loop-avoidance is achieved by the sequence number at the RANN packet. The root node assigns a unique sequence number to each RANN packet and increments the number each time it transmits a new one. The intermediate nodes receiving the RANN packet check the sequence number and drop the packet if the packet's sequence number is smaller or equal to the sequence number of the last RANN packet they forwarded.

Compared with the link-state-based routing mechanism, the distance-vector based forwarding protocol may be adapted more dynamically due to the relatively smaller overhead associated with it. The mechanism in accordance with the embodiment involves the dissemination of RANN packet and the aggregated metric updated with the corresponding link condition, buffer status, congestion report, etc.

FIG. 5 shows RANN dissemination diagram 500 during the ghost beacon interval for semi-static metrics. Considering the various periodicity classes of the metrics, a two-stage forwarding scheme may be used. Initially, the semi-static metrics such as air-time link metric is collected in the network using the RANN packets. These RANN packets may be transmitted during the ghost beacons in the super beacon interval as shown in FIG. 5, occurring immediately following the "Beacon" portion. The dissemination of the RANN packet within the network may follow any flooding scheme disclosed above. For purposes of example, the Beacon Intervals shown in FIG. 5 may be 0.5 ms.

In the second stage, the dynamic metrics such as delay per node and buffer status may be conveyed to the nodes in the network. In this case, the RANN packet may be flooded dynamically in the network. To minimize the effect of flooding in terms of overhead, the RANN packet may be piggybacked to the data packets. A similar scheme is shown in Table 3, where the RALM packets are piggybacked to the corresponding data packets with particular nodes.

The procedural details of the path selection protocols in accordance with the above two embodiments are explained hereafter.

A root node may mean a fiber PoP node. A leaf node means any nodes in the network other than the root node. A requestor node is the node that transmits a PREQ packet to its neighbor nodes. A responder node is the node that receives the PREQ packet from the neighbor node and sends a response. A destination/responder node is the leaf node that a PREQ packet is destined to and responds by sending a path reply (PREP) packet. A downstream traffic is the traffic originated at the root node and flows through the leaf nodes. An upstream traffic is the traffic originated at the leaf nodes and flows through the root node.

Figure 6:
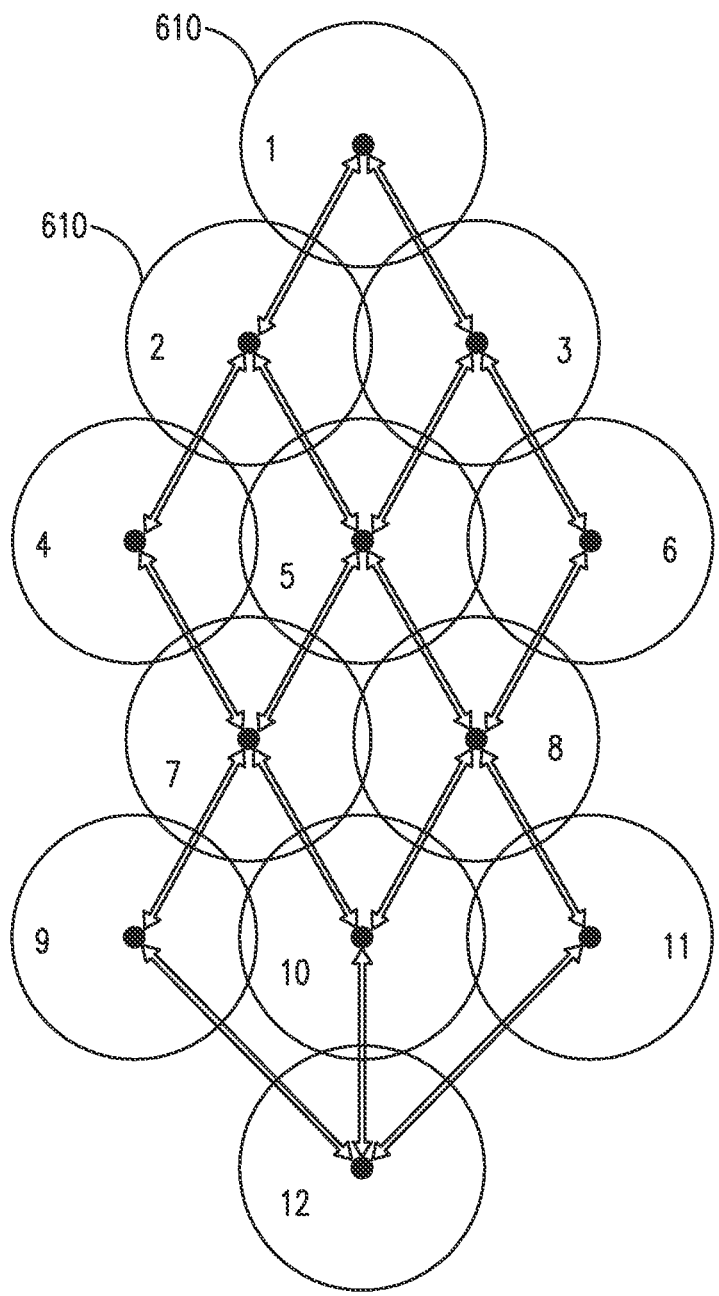
FIG. 6 shows an example network wherein Node 1 is fiber PoP (root node)

Procedural details in the directional distance vector-based routing protocol in mesh networks are explained hereafter. FIG. 6 shows an example network 600, containing nodes 610 (designated 1-12), wherein Node 1 is fiber PoP (root node). The nodes 610 are in communication with one another as shown by the double-arrows between adjacent nodes 610.

Distance vector routing (DVR) algorithm utilizes the aggregate metric information to determine the next hop in path selection. In this path selection scheme, hop-by-hop decision making may be utilized such that each node re-calculates the path to the destination for each packet to be transmitted toward the destination.

The root node, (e.g., the fiber PoP node), may proactively transmit a PREQ packet to initiate path selection mechanism from other nodes (leaf nodes) towards itself. The PREQ packet may be transmitted periodically. The receiving nodes may identify multiple candidate paths towards the root node and sort the candidate paths with respect to the aggregate metric information and also path diversity obtained from the corresponding PREQ packets.

A node may determine its next hop in the path based on the candidate paths it has determined as well as the buffer status of the neighbor nodes, or the like. Hence, the scheduling mechanism is closely tied with the path selection.

The downstream path selection procedure may be based on the PREP packets that are feedback from the leaf nodes to the root node. The PREP packets may be transmitted along the paths the PREQ packets are received and the intermediate nodes may determine the candidate paths to the leaf node.

The PREQ and PREP frames are used to determine the downstream and upstream paths in the network. FIG. 7 shows an example format 700 of a PREQ packet and FIG. 8 shows an example format 800 of a PREP packet. The PREQ packet includes a frame control field 710, a plurality of address fields 720, a plurality of metric fields 730, a Sequence Number field 740 and a QoS Class field 750. The address fields 720 may include a Source address (add.) field 721, a Destination address field 722, Node1 address field 723, Node2 address field 724, Node3 address field 725 and Node4 address field 725. The PREP packet includes a frame control field 810, Source address field 820, Destination address field 830, Node1 Address field 840, Node2 address field 850, Node3 address field 860, Node4 address field 870, metric fields 880, Sequence number field 890 and QoS class field 895.

Both the PREQ and PREP packets contain the source and destination addresses (Node IDs) as well as the addresses of the nodes traversed along the path. In PREQ frames, each intermediate/requestor node that propagates the frame adds its address to the address field 720. Hence, the receiving node has full address information of the nodes the PREQ packet traversed. Accordingly, in the example format 700, there are 4 nodes shown.

The PREP packet contains the addresses of the nodes along the path. The end-to-end addressing scheme is already included by the requestor/source node, which is obtained from the received PREQ packets. The PREP packet follows the path denoted by the addresses.

In this embodiment, the PREQ packet may be flooded into the network, hence the Destination address field may be assigned with all 1's. On the other hand, the Destination address field in the PREP packet may be assigned with the root node address as the PREP frame is destined for the root node.

The metric fields 730 in the PREQ frame may contain both the downstream and upstream aggregated metrics of the path the packet is associated with. For example, the metric fields 730 may be split into Air-time Link Metric (ALM) fields 731 and 733 (downstream and upstream respectively), and Average Buffer Occupancy (ABO) fields 732 and 734 (downstream and upstream respectively), which may be used by the destination node to determine the overall aggregated metric.

The metric fields 880 in the PREP packet contains the downstream metric field which is split into an ALM field 881 and ABO field 882.

A sequence number is assigned by the root node and increased each time a new PREQ frame is transmitted.

The QoS Class fields 750 and 895 may be two N-bit fields where N is the number of distinct QoS classes to be carried in the network. Each N-bit field corresponds to the upstream and downstream QoS class. The QoS class bitmap is updated by each node in the path to indicate the type of traffic this particular path is able to carry satisfying their QoS requirements. For example, in case of 3 unique QoS classes, (voice, data, and best effort), the QoS field in upstream given by $b_1 b_2 b_3 = 010$ may denote that the path associated with the particular packet is able to satisfy the requirements of data traffic in the upstream direction.

The PREQ frames may carry semi-static path metrics, such as ALM and ABO of the path they are associated with. The PREP frames may be used to send the feedback of the paths and their semi-static metrics to the root node. Both PREQ and PREP frames may be transmitted in relatively infrequent periods, (e.g., within every beacon interval). The root and intermediate nodes may schedule data periods to transmit the PREQ and PREP frames.

FIG. 9 shows a PREQ and PREP frame scheduling 900 in the beacon interval. As shown in FIG. 9, there is a beacon interval, which may be 0.5 seconds, which may be split into a beacon and receive interval $I_1$, and a data transmission interval, which may include a plurality of scheduling intervals and PREQ/PREP transmissions, $(I_2, I_3 \ldots I_R)$. For purposes of example, intervals $I_1, I_2, I_3 \ldots I_R$ may be in the order of 0.5 ms.

The upstream (leaf-to-root) path formation procedure starts with the root node broadcasting a PREQ packet to the network. The root node may schedule data slots to transmit the PREQ packet to its neighbors. The requestor node processes the received PREQ frame and updates the address and metric fields to account for the link in between. Then, the updated PREQ frame is sent to all one hop neighbors of the requestor node.

The requestor node, before sending the PREQ packet to a responder node, updates the PREQ frame as follows. FIG. 10 shows an example diagram 1000 of a flow direction and updating of a metric field of the PREQ frame by a requestor node that include a Node K $1010_1$, Requestor Node $1010_2$, and Responder Node $1010_3$.

The downstream ALM 1020 is for the downstream from Node K $1010_1$ to the requestor node $1010_2$, and the downstream ABO 1030 is for the downstream from the requestor node $1010_2$ to the responder node $1010_3$. The upstream ALM 1040 is for the upstream from the responder node $1010_3$ to the requestor node $1010_2$, and the upstream ABO 1050 is for the upstream from the requestor node $1010_2$ to Node K $1010_1$. The requestor node $1010_2$ may add its node address/ID to the address field. The requestor node $1010_2$ may update the downstream average buffer occupancy field with its average buffer occupancy which is obtained from the transmit buffer size corresponding to the responder queue. The requestor node $1010_2$ may also update the downstream air-time link metric field with the link metric obtained from the test packet transmitted by the node that it received the PREQ packet and the upstream buffer occupancy field with its average buffer occupancy which is obtained from the transmit buffer size corresponding to the node that it received the PREQ packet from, (e.g., Node K $1010_1$ in FIG. 10). The requestor node $1010_2$ may update the upstream air-time link metric field with the link metric obtained from the test packet transmitted by the responder node and the requestor node $1010_2$ may also update the QoS Class.

The requestor node $1010_2$ initially identifies which QoS-class the associated path can carry up to this node both in upstream and downstream directions which is directly obtained from the QoS-class field in the received PREQ packet. Using the updated metric field, the node checks whether the updated metrics (ALM, ABO) also satisfy these QoS-classes constraints. If a particular QoS-class cannot be supported anymore with the updated metrics, the corresponding bit, $b_i$, is changed from one (1) to zero (0).

Each node that receives the PREQ frame determines whether to propagate the PREQ packet to its neighbors or drop the packet. This decision may depend on the sequence number. If the sequence number of the received packet is the same or larger than the final PREQ frame available to this node, the packet may be propagated. Otherwise, the packet may be dropped.

This decision may also depend on the total number of hop counts. The node checks the total number of hops towards the root node. This may be determined by adding the number of allocated address fields in the PREQ frame. If the number of hops $\geq H$, (e.g., H=5), the node may not propagate the PREQ packet to its neighbors.

This decision may be made to avoid loop. The node checks the address fields in the PREQ packet and propagates the packet to the neighbors which are not in the list. If the received PREQ packet by the node contains the node's address in the address field of the packet, the node may drop the packet. This decision may also depend on QoS Class. If no QoS class requirement is satisfied by the updated metric both in the upstream and downstream directions, the packet may not be propagated.

The destination/responder node may wait for a predetermined duration (twPREQ duration) after receiving the PREQ frame that has a larger sequence number from the final PREQ frame available to it. During this time window, the node may receive multiple PREQ packets each traversing unique paths initiated from the root node. With the available PREQ packets at hand, the destination/responder node initially categorizes each PREQ frame under a particular QoS class, (e.g., class I, II, III, IV, etc.). The categorization may be done using the QoS class field in the PREQ packet and may depend on the aggregate upstream metrics at the destination/responder node as well as the QoS class constraints. It should be noted that a PREQ frame may be under multiple QoS class categories. The node may sort candidate paths under each QoS category using the upstream metrics. Table 4 shows example categorization and sorting of the upstream paths associated with each the PREQ packets based on QoS classes and weighted upstream metrics.

TABLE 4

|       | Class I | Class II | Class III | Class IV |
|-------|---------|----------|-----------|----------|
| PREQ 1 | 2 | X | X | 3 |
| PREQ 2 | x | 1 | X | 1 |
| PREQ 3 | 1 | 2 | 1 | 2 |

In the path sorting procedure, the node may utilize the upstream aggregate metric per QoS class (e.g., upstream ALM and ABO) and/or path diversity which is a quantitative output that identifies unique number of links in the candidate links.

The sorting procedure determines the next hop to transmit the packet. The aggregated upstream metric information, (e.g., upstream ALM and ABO), gives the end-to-end metric corresponding to each path and hence the next hop to forward a packet in the path. However, the aggregate metric does not capture how many unique links that particular PREQ packet traverses with respect to the other PREQ packets that lead the same next hop in the associated path to the root. In some cases, the destination/responder node may instead select another neighbor in the list which does not necessarily give the best aggregate metric, but the one with more diversified candidate paths.

In one embodiment, the number of independent links at each path may be determined and utilized to sort the candidate upstream paths. The number of independent links from candidate next hop to the root node may be given as follows:

$$P_{d,n_H} = \sum_{k|k \in n_H} \frac{N_{i,k}}{d_k}, \quad \text{Equation (3)}$$

where $n_H$ is the next hop candidate node for the destination/responder node, $N_{i,k}$ is the number of unique links in the candidate path k which are not used by other routes where the candidate paths have $n_H$ as the common next hop node, and $d_k$ is the number of hops per path k.

Referring back to FIG. 6 as an example, consider the candidate upstream paths identified by Node 12, which essentially satisfy the QoS constraints of a particular traffic (e.g., data traffic) as: Path A: 12-10-8-5-3-1, Path B: 12-10-7-5-3-1, Path C: 12-11-8-5-2-1, and Path D: 12-11-8-6-3-1.

Using equation (3), the path diversities for each common next hop node of Node 12, (i.e., Node 10, and Node 11), may be determined as follows:

$P_{d,N10} = 5/5 + 2/5 = 1.4$, $P_{d,N11} = 5/5 + 3/5 = 1.6$.

In this example, selecting Node 11 provides as the next hop provides better upstream path diversity.

The final sorting of the candidate upstream paths may depend on the diversity level as explained above and the metric information obtained from the PREQ frame (e.g., upstream ALM and ABO). The destination/responder node may sort the candidate paths in the upstream to the root node utilizing the path diversity as well as the aggregate upstream metrics obtained from the PREQ packets, (i.e., upstream ALM and ABO), denoted by $M_i$.

The following gives the next hop in the upstream path:

$$\overline{U} = \underset{n_H}{sort} M_{N_H,av} \cdot P_{d,n_H}, \quad \text{Equation (4)}$$

$$M_{N_H,av} = \frac{1}{n_{M_{nH}}} \sum_{i|i \in n_H} M_i,$$

where $P_{d,n_H}$ is given in equation (3).

In another example, considering the candidate paths in the above example, assume that the following aggregated upstream metrics, which is a combination of upstream ALM and ABO, are associated: $M_A=3$, $M_B=2.5$, $M_C=2.9$, $M_D=2.4$. Using equation (4), $\overline{U}=\text{sort}(\frac{1}{2} \times (3+2.5) \times 1.4, \frac{1}{2} \times (2.9+2.4) \times 1.6) = (4.24, 3.85)$, where the first element, 4.24, corresponds to the paths with the next hop Node 11 and the second element, 3.85, corresponds to the ones with the next hop Node 10. In this example, the semi-deterministic sorting provides Node 11 as the best next hop to forward a packet.

The output of the weighted sum, (e.g., ordering of next hop neighbors based on the semi-static metrics), along with the instantaneous buffer status report exchanged with these neighbors may be used to determine the next hop in forwarding a packet.

Candidate path set determination for the downstream traffic follows similar procedures to the procedures for the upstream as explained above. The destination/responder leaf node receives PREQ packets within the twPREQ time duration and identifies all candidate paths in the downstream. The intermediate node and root node are informed regarding these candidate paths via feedback which are transmitted by PREP frames. Then, based on the diversity level and aggregate downstream metric information, the intermediate nodes and root node sort candidate paths for downstream traffic.

The destination/responder node may receive multiple PREQ frames within the twPREQ period. The procedures to determine candidate paths in the upstream are explained above. Similarly, the node may utilize the PREQ frame to determine the downstream candidate paths. Using the Address field 720 and the Downstream QoS Class field 750 in the PREQ frame, the destination/responder node may prepare the PREP packet for each received PREQ packet, which has the same address and QoS Class fields. The source and destination addresses of the PREP packet are updated by the destination/responder node's ID and Root ID, respectively. Hence, each PREP frame traverses the same path in reverse direction (upstream) the corresponding PREQ packet was propagated (downstream).

Once the twPREQ period is completed and the destination/responder node determines the candidate paths in the downstream, the node sends a PREP frame along each of the candidate paths, e.g., $PREP_1$, $PREP_2$, ..., $PREP_N$.

Figure 11:
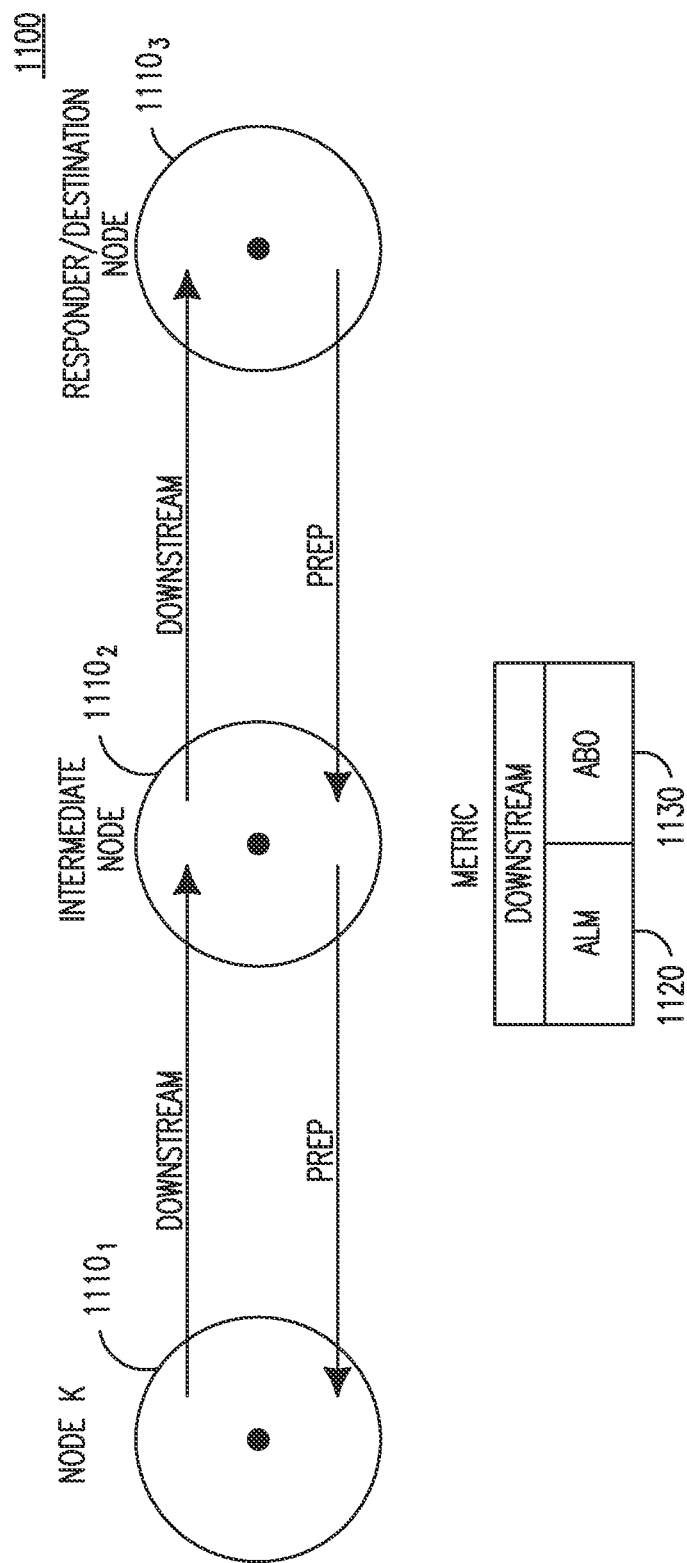
FIG. 11 shows an example diagram of a flow direction and updating of a metric field in the PREP frame by an intermediate node.

FIG. 11 shows an example diagram 1100 of a flow direction and updating of a metric field in the PREP frame by an intermediate node. FIG. 11 shows a Node K $1110_1$, Intermediate Node $1110_2$ and Responder/Destination Node $1110_3$.

The intermediate node(s) receiving a PREP frame may update the downstream average buffer occupancy field with its average buffer occupancy which is obtained from the transmit buffer size corresponding to the responder queue. The intermediate node(s) may also update the downstream air-time link metric field with the link metric obtained from the test packet transmitted by the node that it received the PREP packet from, e.g., Node K $1110_1$ in FIG. 11. In FIG. 11, the downstream ALM 1120 is for the downstream from Node K $1110_1$ to the intermediate node $1110_2$, and the downstream ABO 1130 is for the downstream from the intermediate node 1110₂ to the responder/destination node 1110₃.

The intermediate node 1110₂ receiving the PREP frame may wait for a predetermined period, (e.g., a twPREP duration), to receive other potential PREP frames transmitted by the responder/destination node 1110₃. After collecting the PREP packets within this time period, the intermediate node 1110₂ may identify all candidate paths in the downstream. Initially, the intermediate node 1110₂ categorizes each candidate path under the QoS class traffic flows. Depending on the aggregate and weighted metric determination, the intermediate node 1110₂ may sort the paths associated with each PREP frame per QoS class. Table 5 shows example categorization and sorting of the downstream paths associated with the PREP packets based on the QoS classes and weighted downstream metrics.

TABLE 5

|  | Class I | Class II | Class III | Class IV |
|---|---|---|---|---|
| PREP 1 | X | X | 1 | 3 |
| PREP 2 | 1 | 2 | X | 1 |
| PREP 3 | 2 | 1 | 2 | 2 |

The PREP frame may include the downstream metrics: ALM and ABO, etc. The node that receives the PREP frame may determine the downstream aggregate metric to the destination/responder node (e.g., downstream ALM and ABO) and/or the path diversity, which is a quantitative output that identifies the number of links towards the responder/destination node in the candidate links.

The path diversity may be calculated to account for the downstream paths and the next hop neighbors of the intermediate nodes in the downstream direction. The next hop neighbors in the downstream direction may be obtained from the address field of the PREP frame. The responder node 1110₃ may calculate the diversity level in the downstream as follows:

$$P_{d,n_D} = \sum_{k|k \in n_D} \frac{N_{i,k}}{d_k},$$ Equation (5)

where $n_D$ is the next hop candidate node for the intermediate node, $N_{i,k}$ is the number of unique links in the candidate path k which are not used in others where the candidate paths have $n_D$ as the common node, and $d_k$ is the number of hops per path k.

The downstream candidate path set sorting procedure at the intermediate node 1110₂ is performed as follows:

$$\overline{D} = \underset{n_D}{sort} M_{N_H,av} \cdot P_{d,n_D},$$ Equation (6)

$$M_{N_H,av} = \frac{1}{n_{M_{nH}}} \sum_{i|i \in n_D} M_i,$$

where $M_i$ is the aggregate downstream metrics obtained from the PREQ packets, (i.e., downstream ALM and ABO).

Similar to upstream packet forwarding, the intermediate node may utilize the vector $\overline{D}$ and instantaneous buffer status reports of the next hop nodes in the downstream direction. The downstream candidate path establishment terminates once the PREP packet reaches to the root node and the root node determines its candidate downstream paths.

Figure 12:
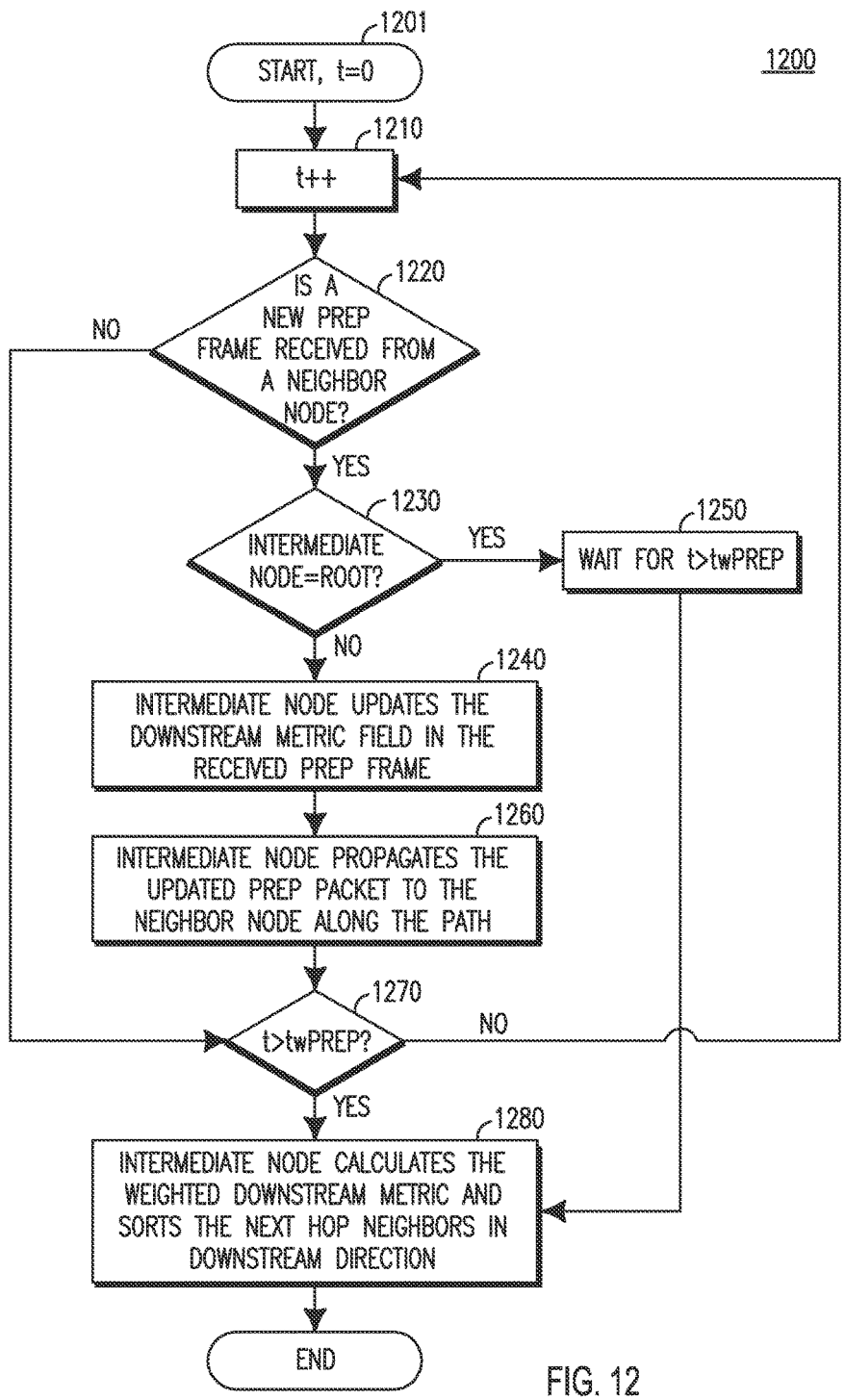
FIG. 12 is an example flow diagram of an example procedure for downstream candidate path sorting for intermediate and root nodes.

FIG. 12 is an example flow diagram of an example method 1200 for the downstream candidate path sorting for the intermediate and root nodes. The method 1200 demonstrates example PREP frame processing and propagation from a mesh node's, (e.g., intermediate node's), perspective. A responder/destination node, as explained above, receives PREQ frame which is initially broadcasted by the root node to the network. Then the node transmits a PREP frame corresponding to each PREQ packet it receives. The intermediate node collects all PREP frames received within twPREP window and propagates to the next hop after updating the metric fields as explained.

In step 1201, the method starts at t=0. At t++ (step 1210), the procedure advances to where it is determined whether or not a new PREP frame is received from a neighbor node (step 1220). If a new PREP frame is received from a neighbor node, then the procedure advances to step 1230, otherwise, the procedure advances to step 1270. If the intermediate node 1110₂ is not the root node in step 1230, then the procedure proceeds to step 1240 where the intermediate node 1110₂ updates the downstream metric field in the received PREP frame. If the intermediate node 1110₂ is the root node in step 1230, then the procedure waits for time t to be greater than twPREP (step 1250), and advances to step 1280 where the intermediate node 1110₂ calculates the weighted downstream metric and sorts the next hop neighbors in the downstream direction.

Referring back to step 1230, if the method advances to step 1240, the updated PREP packet is propagated to the neighbor node along the path by the intermediate node (step 1260) and the procedure advances to step 1270 where it is determined whether time t is greater than twPREP. If time t is greater than twPREP, than the method advances to step 1280, and if it is not, then the method returns to step 1210.

Detailed procedures for directional link state routing protocol in mesh networks are explained hereafter.

Link state routing (LSR) protocol is an alternative embodiment to the distance vector routing algorithm explained above. In LSR, each node has a connectivity table, (e.g., topology information of the network). The metric between any node pair in the network is disseminated to the whole network. Hence, the nodes in the network have access to the metric state of the overall network and are able to determine the optimal paths to the destinations.

A spanning tree of the network establishes path from any node in the network to all others without creating loop. A spanning tree may be obtained from the connectivity table.

In one embodiment, a spanning tree may be used to disseminate metrics between the node pairs to other nodes in the network. The RALM frames may be used to carry the metrics. The path that traverses all nodes in the network is obtained from the spanning tree.

A connectivity table depicts the topology of the network, e.g. the connection set of the whole network. Table 6 shows an example connectivity table of the network shown in FIG. 2A. Only Nodes 1-4 are considered in Table 6. In Table 6, "1" denotes connection and "0" denotes no connection.

TABLE 6

|  | Node 1 | Node 2 | Node 3 | Node 4 |
|---|---|---|---|---|
| Node 1 | x | 1 | 1 | 0 |
| Node 2 | 1 | x | 0 | 1 |

TABLE 6-continued

|        | Node 1 | Node 2 | Node 3 | Node 4 |
|--------|--------|--------|--------|--------|
| Node 3 | 1      | 0      | x      | 0      |
| Node 4 | 0      | 1      | 0      | x      |

Each node informs a dedicated node, (e.g., a fiber PoP or an operation and maintenance (O&M) center), regarding the Node IDs of their one-hop neighbor nodes. The dedicated node, (e.g., the fiber PoP or the O&M center), forms the connectivity table after receiving the neighbor information from all nodes.

The connectivity table is a static set and may be updated with the changes in the topology. The connectivity table may be created or updated periodically, for example, N×BI time where N is a design parameter and BI is the beacon interval, or when a new node is added to the network. Since the nodes do not have any information regarding the possible paths to the dedicated node before the connectivity table establishment, the one-hop neighbor information may be flooded into the network.

FIG. 13 shows an example format 1300 for a generic flooding frame transmitted by each node to convey neighbor node IDs to a dedicated node. The format 1300 includes a Frame Control field 1310, Source address field 1320, Destination address field 1330, TX address field 1340, RX address field 1350, Neighbor Node IDs field 1360, and Sequence Number field 1370.

The source address is the ID of the node that informs the dedicated node regarding its neighbors. The destination address is the ID of the dedicated node. The Tx and Rx addresses are the IDs of the intermediate nodes that convey the packet. In order to avoid forming a loop, a sequence number may be assigned to each packet and incremented each time the source node transmits a new packet. The receiving node forwards the packet if the sequence number is larger than the most up-to-date number available to it. The IDs of the one hop neighbors are carried in the Neighbor Node IDs field 1360 of the packet.

The dedicated node may wait for a predetermined period of time, (e.g., twConnect duration), to receive the connectivity packets. The twConnect duration may be long enough to guarantee reception of these packets. A connectivity table that satisfies the following constraint is considered to be complete where the dedicated node receives the one-hop neighbor packets of all nodes that are identified in the Neighbor Node IDs field of the packets. Assuming a 4-node system with (Node 1, Node 2, Node 3, Node 4), Node 1 sends a packet with Neighbor Node IDs field=(Node 2, Node 3) and Node 2's packet has Node IDs field=(Node 4, Node 5) which is received by the dedicated node. The connectivity table is complete once the dedicated node receives the packets from Node 3, Node 4 and Node 5.

In case a particular node's packet is not received within this duration, its neighbor nodes are informed of the non-reception by the dedicated node (e.g., O&M center) which may trigger another packet transmission by the node. If the packet(s) is not received within another period of time (e.g., addtwConnect duration), the connectivity table may be assumed to be completed.

Figure 14:
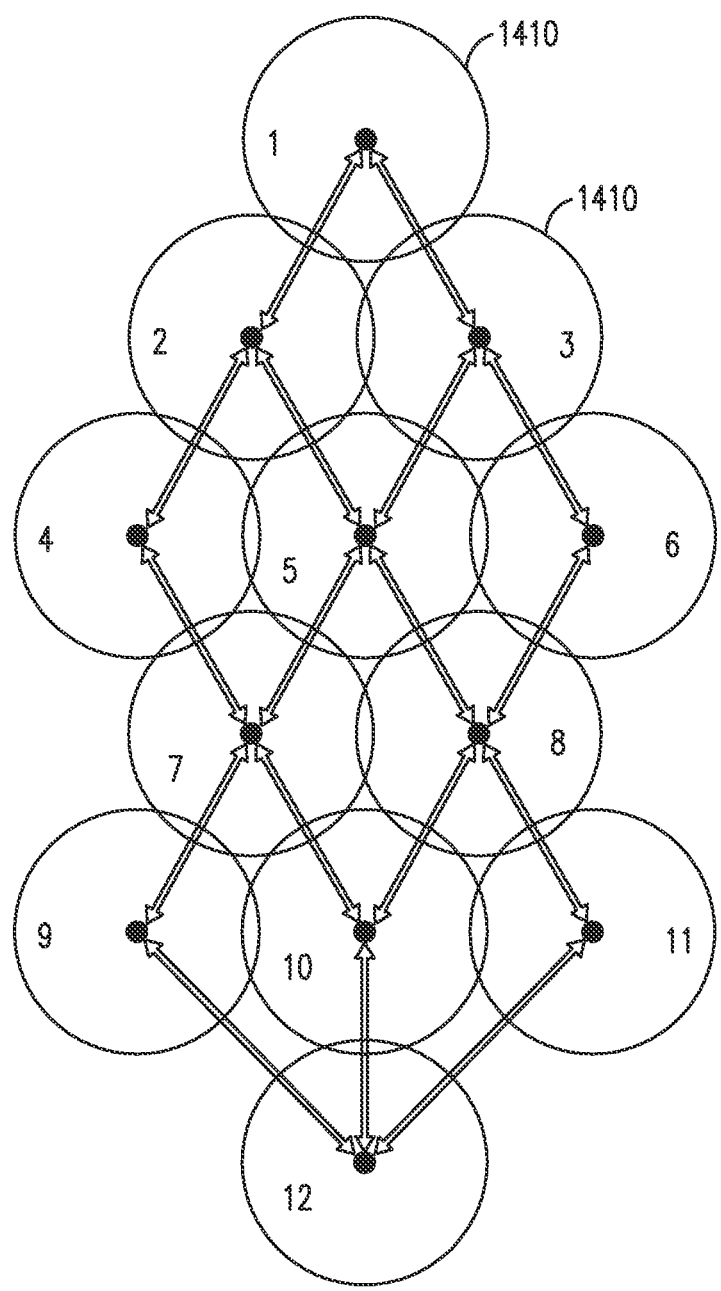
FIG. 14 shows an example spanning tree for a network topology that includes a number of nodes.

Embodiments for spanning tree formation are explained hereafter. Using the connectivity table, the following procedure may provide a spanning tree of the network. FIG. 14 shows an example spanning tree 1400 for a network topology that includes a number of nodes 1410. Although the example network shows twelve nodes 1410, (i.e., 1-12), any number of nodes 1410 may exist.

A node 1410 is selected from the connectivity table (e.g., the Fiber PoP). A search is initiated from the first selected node to find the next hop neighbors. These nodes and the link in between are added to a spanning tree. The same approach is repeated for the nodes added to the spanning tree. The neighbors and the links in between are added if these nodes are not part of the already existing spanning tree. It is continued until convergence.

The connectivity table and the spanning tree are conveyed to each node by the O&M center. The path to forward this information may be directly determined by the spanning tree.

Figure 15:
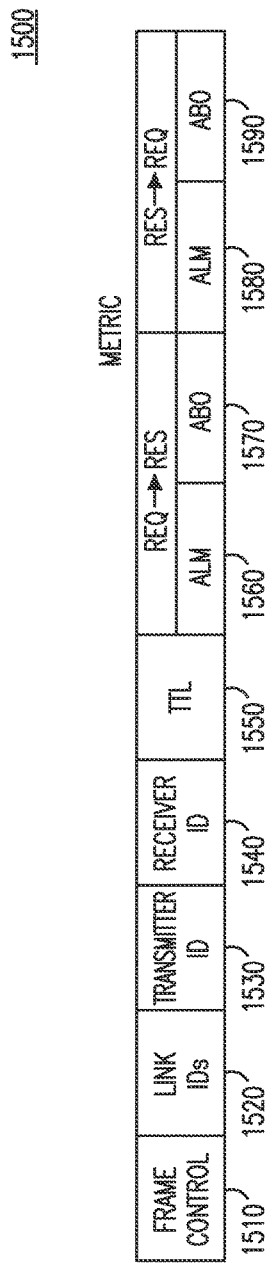
FIG. 15 shows an example format of a RALM frame.

FIG. 15 shows an example format 1500 of a RALM frame. The RALM frame includes a Frame Control field 1510, Link IDs field 1520, Transmitter ID field 1530, Receiver ID field 1540, TTL field 1550, requestor to responder metric fields ALM 1560 and 1570, and responder to requestor metric fields 1580 and 1590.

The RALM frame is used to convey the metrics between the nodes (i,j) to other nodes in the network. The Link IDs in the RALM frame is the indicator of the links between the nodes whose metric values are carried, and Transmitter and Receiver IDs indicate the nodes this information is transported from/to. The metric subframe carries the ALM and ABO metrics, or the like in both directions between the requestor and responder nodes. The RALM frame is generated at the requestor node where test frames between the requestor and responder nodes are used to determine ALM and ABO metrics in both directions.

Figure 16:
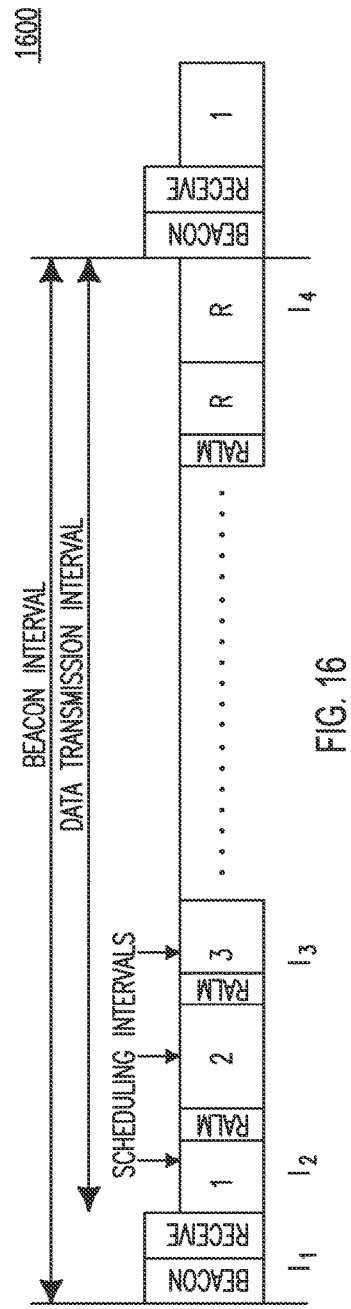
FIG. 16 shows an example of RALM packet scheduling during data scheduling intervals.

Each node propagates the RALM packets during data scheduling intervals. Since semi-static metrics are carried, the RALM packet corresponding to each node may be transmitted within one beacon interval. FIG. 16 shows an example of RALM packet scheduling 1600 during data scheduling intervals. The example scheduling 1600 shows a Beacon Interval, which may be 0.5 seconds, for example, and which may be split into a beacon and receive interval $I_1$, and a data transmission interval, which may include a plurality of scheduling intervals and RALM transmissions, $(I_2, I_3 \ldots I_R)$. For purposes of example, intervals $I_1, I_2, I_3 \ldots I_R$ may be in the order of 0.5 ms.

Figure 17:
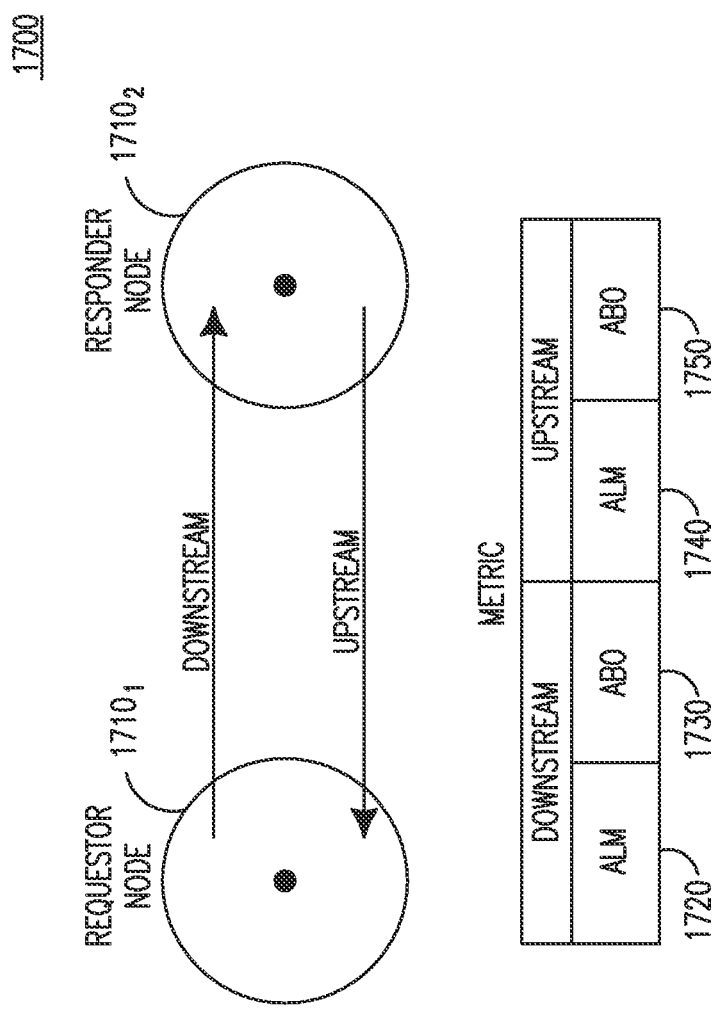
FIG. 17 shows an example RALM frame processing.

FIG. 17 shows an example RALM frame processing 1700, that includes, for example, a Requestor Node $1710_1$ and Responder Node $1710_2$. The broadcast of the RALM packet between Node i and Node j to all other nodes may be carried out by utilizing the spanning tree. The following procedure may be used in forwarding the RALM frame. The requestor node $1710_1$ and responder node $1710_2$ exchange test packets to determine ALM and ABO in both directions, (i.e., ALM 1720 and ABO 1730 in the downstream direction and ALM 1740 and ABO 1750 in the upstream direction). The responder node $1710_2$ may also exchange test packets with its one-hop neighbors which are not in the spanning tree. Additionally, the responder node $1710_2$ may create a RALM frame with the corresponding metric fields, Requestor-Responder Link ID and Responder Neighbor Link ID and assigns its ID to the Transmitter ID field.

For each one-hop neighbor in the spanning tree, the responder node $1710_2$ may send a RALM packet where the receiver ID field is filled with the neighbor node ID. The intermediate node that receives the RALM frame stores the metrics corresponding to the link IDs. After storing the information, the intermediate node conveys the frame to the one-hop neighbor nodes assigning the receiver ID field accordingly. The corresponding RALM packet propagation proceeds until all nodes receive the RALM frame and store the metric information associated with the Responder-Requestor Link ID.

After all the nodes in the network broadcast the RALM frames, each node is able to collect the link-state information of the whole network, which is denoted as link state matrix. The link-state matrix is an N×N matrix and each entry (i,j), i,j=1, . . . , 12 denotes the downstream and upstream ALM and ABO metric corresponding to Node$_i$ and Node$_j$. The matrix shown below is an example link state matrix that is available to each node in the network after RALM transmission.

$$\begin{array}{c} \\ \text{Node 1} \\ \text{Node 2} \\ \text{Node 3} \\ \vdots \\ \text{Node } N \end{array} \begin{bmatrix} \text{Node} & \text{Node} & \text{Node} & & \text{Node} \\ 1 & 2 & 3 & \ldots & N \\ & M_{12} & M_{13} & & M_{1N} \\ M_{21} & & M_{23} & & M_{2N} \\ \ldots & \ldots & \ldots & \ldots & \\ & & & & \\ \ldots & \ldots & \ldots & \ldots & \end{bmatrix}$$

With the link state matrix, the nodes may determine the candidate paths to any node in the network that provide the best metrics, for example, aggregate air-time link metric and average end-to-end delay.

The following procedure may be applied to determine the candidate paths as well as in sorting the paths depending on the aggregate metrics.

Each QoS class is associated with a weighted sum metric which depends on the constraints per the class as follows:

$$M_{AC} = w_1 \cdot M_{ALM} + w_2 \cdot M_{ABO}, \quad \text{Equation (7)}$$

where $M_{ALM}$ is the ALM metric, $M_{ABO}$ is the ABO metric, and $w_1$ and $w_2$ are the weights. For instance, in voice packet transmission, $w_2$ may be much greater than $w_1$, (e.g., $w_2 \gg w_1$).

For each QoS class with the overall metric MAC, a source node may employ Dijkstra's algorithm to determine the best paths to the destination node. This path is stored as a candidate path.

The path determined previously is removed from the candidate path set and Dijkstra's algorithm is employed again to give another candidate path. The algorithm terminates when sufficient number of candidate paths are obtained. Using these procedures, each node is able to determine and sort candidate paths with the corresponding aggregate metric. Similar to the distance vector protocol, it is possible to include the diversity level of the candidate paths in re-sorting them to provide that the selected path has sufficient diversity level in case the instantaneous link capacity or grant request is not enough. Accordingly, a link capacity metric may be considered an instantaneous metric.

Embodiments for joint routing and scheduling for directional mesh networks are explained hereafter.

The semi-static routing algorithm described above produces multiple candidate paths between the source and destination nodes that enable hop-by-hop packet forwarding. Multiple candidate paths may be determined based on global metrics such as link budgets, the connectivity level of each candidate neighbor (path diversity) to the destination, and interference created to the other nodes associated with selection of each candidate next hop.

These semi-static global path metrics may be exchanged infrequently to limit signaling overhead. Therefore, the frequency of nodes reacting to network condition changes may be limited to the metric refresh rate. In one embodiment, based on scheduler decisions, nodes may react to local traffic variations in between complete path metric refresh instances.

The semi-static routing algorithm output may include multiple paths between the source and destination nodes. Consider one such route that is selected by the routing algorithm with $N_i$ hops. Its airtime link metric may be expressed as follows:

$$c_{a_i} = \sum_{i=1}^{N_i} \left(O_i + \frac{B_t}{r_i}\right) \frac{1}{1 - e_{f_i}} \quad \text{Equation (8)}$$

with the numbering starting from the source node. The routing function at the source node obtains the values of $O_1(k)$, $r_1(k)$ and $e_{f_1}(k)$ from the scheduler at time t=k. Then the metric evaluated at time t=k−1 is updated as:

$$c_{a_i}(k) = c_{a_i}(k-1) - \left(O_i(k-1) + \frac{B_t}{r_i(k-1)}\right) \frac{1}{1 - e_{f_i}(k-1)} + \\ \left(O_i(k) + \frac{B_t}{r_i(k)}\right) \frac{1}{1 - e_{f_i}(k)}. \quad \text{Equation (9)}$$

The updated metric is used for path selection by comparing against the corresponding metric for an alternate path, $c_{a_j}(k)$. This allows the scheduler to affect routing decisions. The full semi-static path metrics are used when available. For the subsequent time instants (scheduling intervals), the path metrics may be updated locally and new paths may be selected till the arrival of the next full path metric. This procedure allows network nodes to rapidly react to network changes without requiring frequent full path metric updates.

Figure 18:
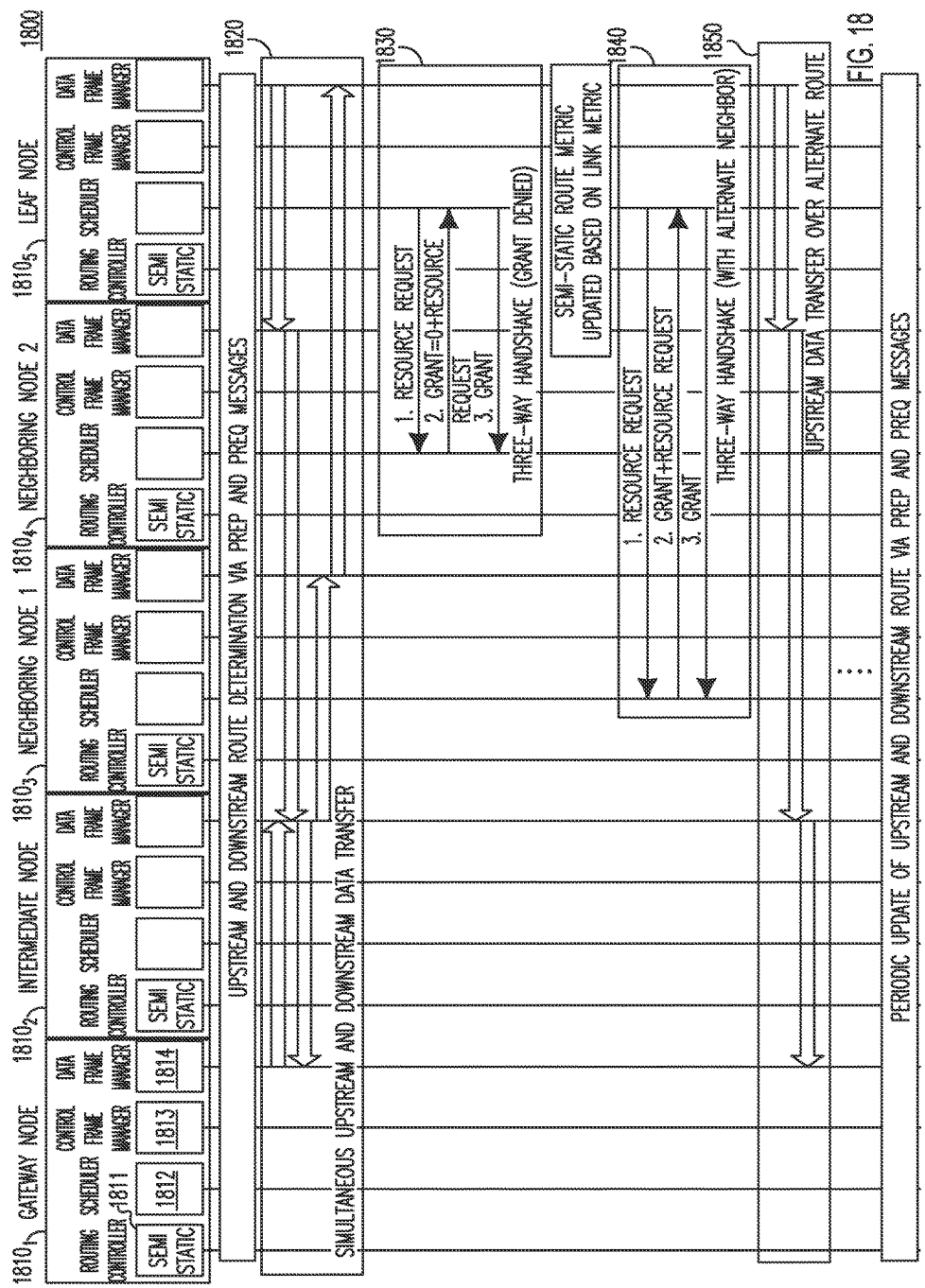
FIG. 18 is an example signaling diagram of routing with scheduling inputs.

FIG. 18 is an example signaling diagram 1800 of routing with scheduling inputs. As shown in FIG. 18, there are a plurality of nodes 1810 in communication with one another and exchanging signaling with one another, (e.g., Gateway Node 1810$_1$, Intermediate Node 1810$_2$, Neighboring Node 1 1810$_3$, Neighboring Node 2 1810$_4$, and Leaf Node 1810$_5$). Each node 1810 may include a routing controller 1811 (which includes semi-static information), a scheduler 1812, a control frame manager 1813, and a data frame manager 1814. The routing Manager 1811 may be responsible for originating and terminating routing related messages such as PREQ and PREP messages. The actual transmission and reception of these routing messages may be handled by the Control frame Manager 1813. The Scheduler 1812 schedules transmission of data and control frames in coordination with corresponding Scheduler entities in other nodes. The Data Frame Manager 1814 handles transmission and reception of data frames.

Data transfer in FIG. 18 occurs between the various nodes in accordance with the arrows shown (1820).

Continuing to refer to FIG. 18, in the signaling described in 1830, the leaf node 1810$_5$ initially forwards upstream data, that is addressed to Gateway Node 1810$_1$, to neighboring node 2 1810$_4$, which may be selected by the routing algorithm based on semi-static routing metrics. The neighboring node 2 1810$_4$ then forwards the data to intermediate node 1810$_2$, according to the route set up earlier using the routing algorithm based on semi-static routing metrics. Finally, the data gets forwarded to the destination, gateway node 1810$_1$, again based on the same routing decision as before. However, for downstream data, the path selected by the routing algorithm differs from that for upstream data as shown in FIG. 18. In this case, the data is forwarded from gateway node 1810$_1$ to intermediate node 1810$_2$, then to neighboring node 1 1810$_3$, and finally to the destination, leaf node 1810$_5$. Thereafter, in accordance with the signaling described in 1830, neighboring node 2 1810$_4$ rejects the leaf node's resource request in a scheduling interval, which changes the link metric according to the equation above. The semi-static route metric is updated based on the current local link metric.

Then, in accordance with the signaling described in 1840, the route passing through neighboring node 1 1810$_3$ results in a smaller cumulative path metric than the original route, and the leaf node 1810$_5$ re-routes the traffic through neighboring node 1 1810$_3$. The end-to-end routes are re-evaluated as part of the next periodic link status update, based on PREQ and PREP message exchange. Upstream data transfer then proceeds over the alternate route through neighboring node 1 1810$_3$ and intermediate node 1810$_2$ to gateway node 1810$_1$, as described in the signaling shown in 1850, and periodic updating of the upstream and downstream route, or routes, via the PREP and PREQ messages continues to occur.

Embodiments for dynamic back pressure based forwarding are explained hereafter. Using either link state or distance vector mechanisms, the semi-static metrics (such as airtime link metric) are exchanged between the mesh nodes. Based on the semi-static information, possible destination paths are determined for each packet by the routing layer. This is the first stage of the process where candidate paths for a particular destination and particular QoS are obtained. The routing layer then provides this input to the medium access control (MAC) layer. In the second stage of the process, the MAC layer uses dynamic back pressure inputs on top of the path selection inputs provided by the routing layer to determine the next hop destination. The back-pressure feedback may either be explicit or implicit, which will be explained in detail below.

With regard to an explicit back-pressure feedback procedure, each node in the mesh network may exchange the buffer status of the transmit queues for the receiver to perform scheduling that takes into account the transmit buffers of all the potential transmitters. In addition to that, for the explicit back-pressure procedure, each receive mesh node in the network exchanges the buffer status of the receive queues. This may enable the transmitter to perform back-pressure based forwarding. A receiver may send buffer status of receive queues and a transmitter then uses dynamic back-pressure algorithm to forward packets to the receiver.

Figure 19:
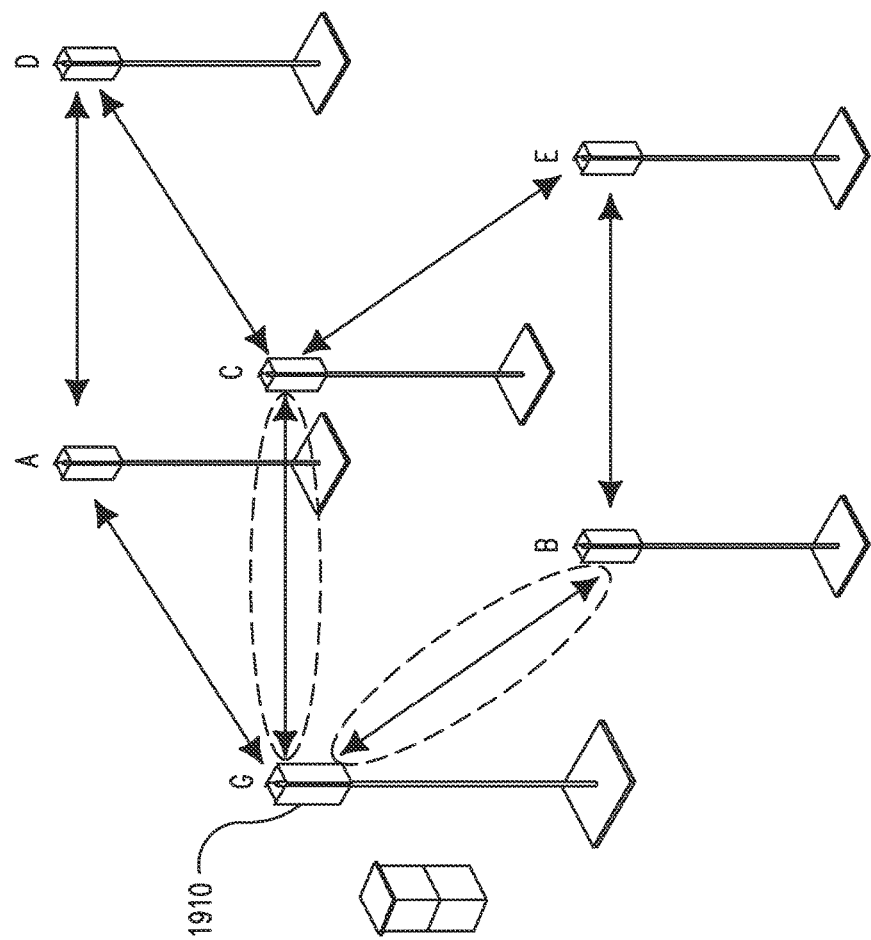
FIG. 19 shows an example directional mesh network after path selection.
Figure 20:
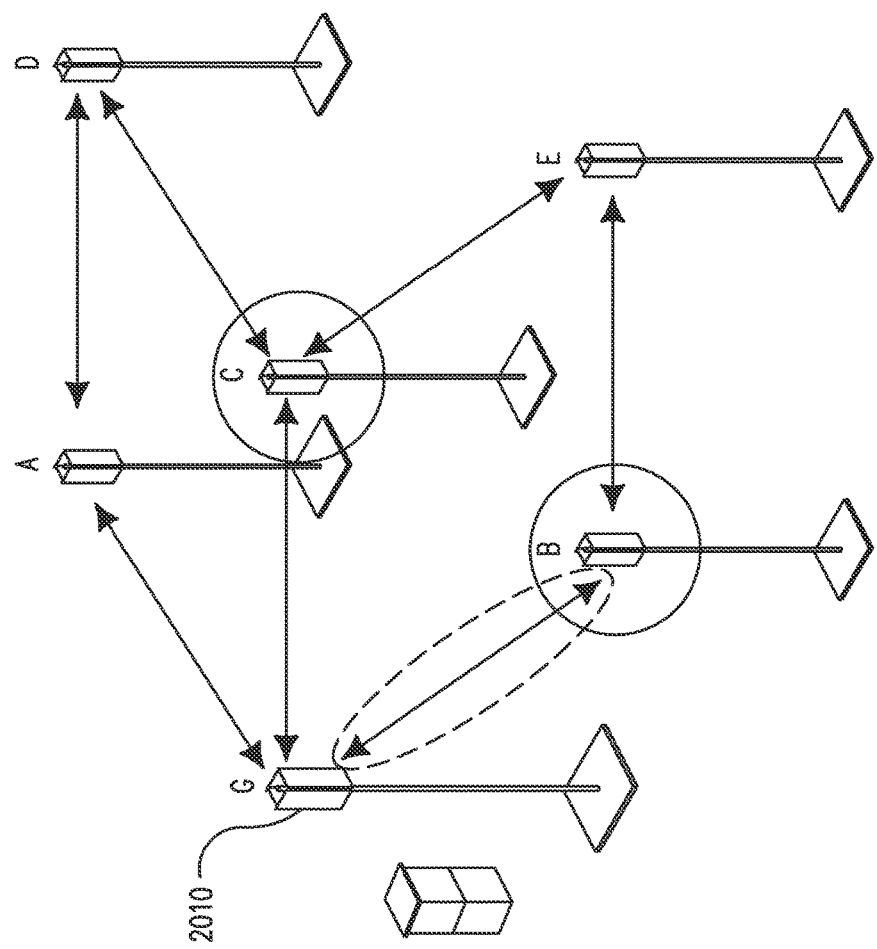
FIG. 20 shows an example directional mesh network after back back-pressure inputs.

FIG. 19 shows an example directional mesh network 1900 after path selection and includes nodes 1910, (designated A, B, C, D, E, and G). FIG. 20 shows an example directional mesh network 2000 after back back-pressure inputs and includes nodes 2010, (designated A, B, C, D, E, and G).

As an example, in FIG. 19, designating node G as the source node and node E as the destination node, for the given topology, the possible paths are (G, C, E), (G, B, E), (G, A, D, C, E). Based on the semi-static link metrics, the routing layer may provide two candidate paths (G, C, E) and (G, B, E) to the MAC layer. Whenever a new data packet that is destined to node E is received at the MAC layer of node G, the following may be executed.

During each scheduling interval, nodes A, B and C provide both their transmit buffer status and the receive buffer status to node G. The MAC scheduler in node G now has two possible destinations for next hop, node B and C based on the inputs from the routing layer.

Node G compares the receive buffers of node B and C that were received previously. Different outcomes may be made depending on the case. For the case when path metrics of (G, B, E) and (G, C, E) are the same, if the difference in the queue lengths between G-B is greater than G-C, then node G may choose node B as the next hop. This would continue as long as the queue differentials of G-B is greater than G-C. Whenever the queue differentials of G-C become greater, the MAC scheduler in node G may switch to node C as the next hop. The reverse happens if the queue differentials of G-B were greater.

For the case when path metrics of (G, B, E) are better than (G, C, E), the MAC scheduler in node G initially chooses node B as the next hop to forward the packets. When the difference in the queue lengths of G-C is greater than G-B by a threshold $T_H$, then node G may choose node C as the next hop. This would continue as long as the queue differentials of G-C is greater than G-B by at least $T_L$. Whenever the queue differentials of G-C become less than G-B by more than $T_L$, the MAC scheduler in node G may switch to node B as the next hop. The thresholds $T_H$ and $T_L$ are chosen such that they take into account the path metric imbalance between the path (G, B, E) and (G, C, E), cost associated with choosing the inferior path compared to one-hop link condition, and the particular QoS class (e.g., for delay sensitive traffic, thresholds are chosen to react faster to queue backlogs). These thresholds may be broadcast and may be sent as a part of path/link metrics. Alternatively, these thresholds may be configured to be static for the network and may be broadcasted in the beacon frames.

For the case when path metrics of (G, C, E) is better than (G, B, E), the same procedure disclosed above may be implemented with the roles of nodes C and B reversed.

This is an explicit back-pressure procedure as the buffer status of the receivers (in the example above, nodes B and C) is explicitly sent to the transmitter (in the example above, node G). The buffer status exchange may happen every scheduling cycle and node G receives the dynamic back pressure inputs from node C and B that are exchanged every scheduling interval, an makes the packet forwarding decision on a per packet basis. In addition to the queue depths, the airtime link metrics of immediate hop may also be used in scheduling decisions.

In the implicit back-pressure procedure, the buffer status of the receive queue are not sent by the receiver to the transmitter. A transmitter node may infer the receive buffer status by looking at the delta between scheduling request sent by the transmitter and the scheduling grant sent by the receiver. This assumes that the transmitter sends the buffer status of the transmit queues to the receiver. The receiver then performs the scheduling, taking into account the buffer status of all the potential transmitters. The allocation may be proportional to the queue differentials of all the transmitters and buffer status of the receiver queue.

Each transmitter in the mesh network may exchange the buffer status of the transmit queues to each of the potential receivers. A receiver then performs scheduling that takes into account the transmit buffers of all the potential transmitters. A receiver then provides the scheduling information to each of the transmitters. A transmitter may then use the scheduling information to infer the receive buffer status of the receiver. This input is fed as dynamic back-pressure algorithm to forward packets to the receiver.

As an example, referring again to FIGS. 19 and 20, and designating node G the source node and node E the destination node, for the given topology, the possible paths are (G, C, E), (G, B, E), (G, A, D, C, E). Based on the semi-static link metrics, the routing layer provides two candidate paths (G, C, E) and (G, B, E) to the MAC layer. Whenever a new data packet that is destined to node E is received at the MAC layer of node G, the following procedures may be executed.

The MAC scheduler in node G now has two possible destinations for next hop, node B and C. This is based on the inputs from the routing layer. During each scheduling interval, the mesh nodes B and C receives the transmit buffer status from node G. Node B compares the node G's buffer status with the own receive buffer status and makes the allocation according to the queue differentials.

If node G has more data to send than node B's allocation, and if path metrics of (G, B, E) and (G, C, E) are the same, node G may dynamically split the data to node B or C, depending on the instantaneous allocation from node B and C. If path metrics of (G, B, E) is better than (G, C, E), the MAC scheduler in node G initially chooses node B as the next hop to forward the packets, but when the backlog in node G is greater threshold $T_H$, node G starts splitting the data to node C as well. This would continue as long as the queue backlogs at node G are greater a threshold $T_L$. Whenever the backlogs in node G are less than $T_L$, the MAC scheduler in node G stops splitting the traffic to node C. The thresholds $T_H$ and $T_L$ may be chosen such that they take into account the path metric imbalance between the path (G, B, E) and (G, C, E) and cost associated with choosing the inferior path compared to one-hop link condition, and the particular QoS class, (for example, for delay sensitive traffic, thresholds may be chosen to react faster to queue backlogs). These thresholds may be broadcast and may be sent as a part of path/link metrics. Alternatively, these thresholds may be configured to be static for the system and may be broadcasted in the beacon frames.

If the path metrics of (G, C, E) are better than (G, B, E), the same procedure disclosed above may be implemented with the roles of nodes C and B reversed. This is an implicit back-pressure procedure as the buffer status of the receive queue are not sent by the receiver to the transmitter. A transmitter node may infer the receive buffer status by looking at the delta between scheduling request sent by the transmitter and the scheduling grant sent by the receiver. This assumes that the transmitter sends the buffer status of the transmit queues to the receiver. The receiver then performs the scheduling, taking into account the buffer status of all the potential transmitters. The allocation may be proportional to the queue differentials of all the transmitters and buffer status of the receiver queue. In addition to the queue depths, the airtime link metrics of immediate hop may also be used in scheduling decisions.

Embodiments for combined interference measurement and routing path metric transfer are explained hereafter. For a mmW based mesh network, the interference measurements may be executed by scheduling the active transmissions for each of the mesh node in a particular direction. These transmissions may be scheduled periodically in all the neighbor directions that are active. These measurement campaigns may be carried out in a pre-determined frame which schedules the nodes for the measurement campaign. In one embodiment, the transmissions which are used by the receiver nodes to measure the interference power may be used to carry the path/link metrics. These metrics may be a combination of one or more of air time link metric, average buffer occupancy etc. At least one hop neighbors of the transmitting node may receive the path metrics using this procedure. This may save the time and resources which could otherwise be used to schedule the metric transmission during a data period.

Figure 21A:
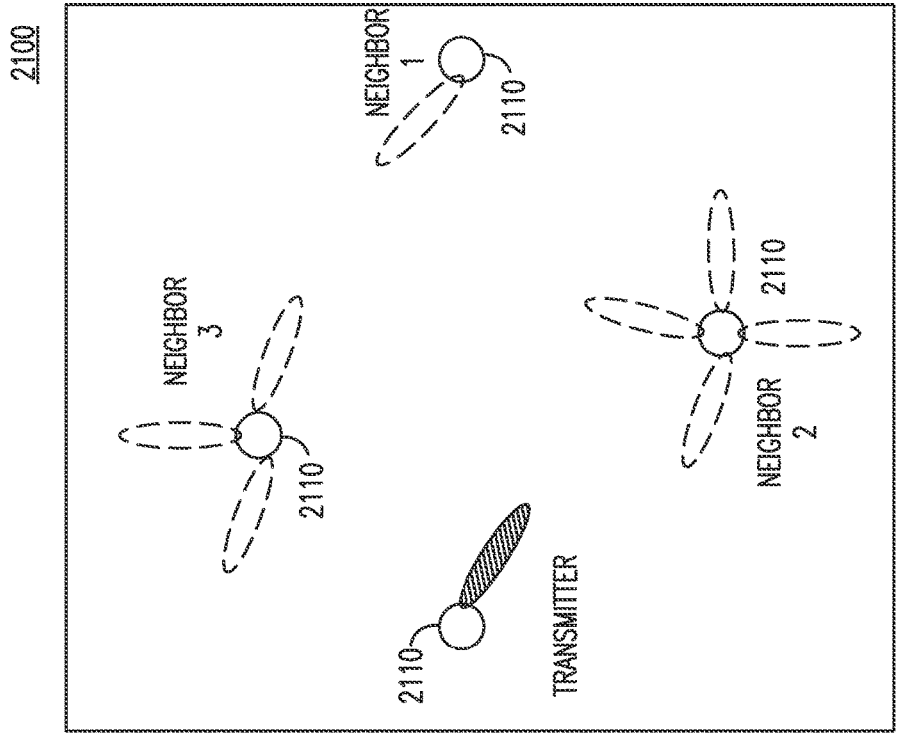
FIGS. 21A and 21B are example diagrams of a system combining interference measurement and routing path metric transfer.
Figure 21B:
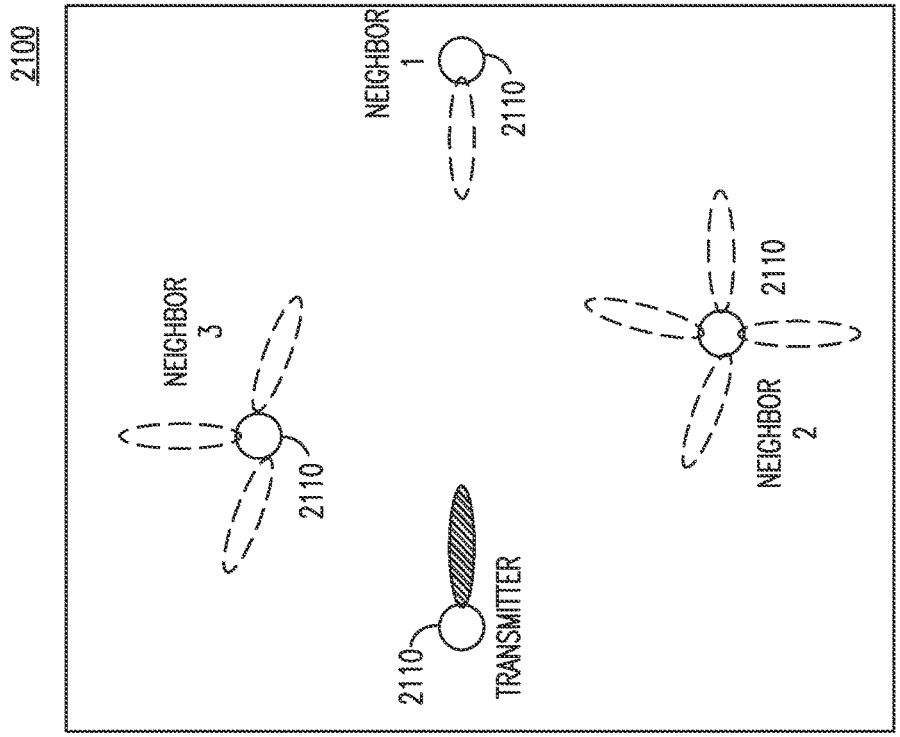

FIGS. 21A and 21B are example diagrams of a system 2100, including nodes 2110, combining interference measurement and routing path metric transfer. As an example, in FIGS. 21A and 21B, there are four nodes 2110 that are part of a mesh network (designated Transmitter, Neighbor 1, Neighbor 2, and Neighbor 3). The neighbor nodes 1 and 2 are the one hop neighbors of transmitter node, while neighbor node 3 is at least two hops away. Periodic measurements may be setup such that in a particular frame, the transmitter node may be scheduled to transmit towards each of its neighbor nodes, and all the nodes in the interference zone (may be two hops or more) may measure the received interference power. The routing path metric may be sent when the transmitter node cycles through each of its transmit directions towards its one hop neighbor nodes. In the example, the neighbor 1 and neighbor 2 may receive and decode the transmissions and update the routing metric provided by the transmitter. Neighbor 3 whose receive power is such that it cannot decode the message, just measures the interference power and reports back to transmitter. The same procedure may be applied when all other nodes transmit. This mechanism helps in transmitting the path metric to the neighbor nodes in the interference measurement frame, rather than during data frame.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

The invention claimed is:

1. A method for joint routing and distributed scheduling in a wireless directional mesh network, implemented in a first node of the wireless directional mesh network, comprising:
    receiving feedback for multiple candidate paths across the wireless directional mesh network from at least one neighbor node;
    determining semi-static metrics based upon the received feedback, wherein the semi-static metrics include at least a path diversity metric that includes a connectivity of an intermediate node to a destination node in the wireless directional mesh network;
    determining instantaneous metrics based upon the received feedback;
    determining routing from the first node to the destination node based upon the semi-static and instantaneous metrics, and a back-pressure, wherein, the back-pressure is determined explicitly and wherein the semi-static metric includes information relating to a node creating interference and a power level of the interference; and routing a transmission in accordance with the determined route from the first node to the destination node across the wireless directional mesh network.

2. The method of claim 1 wherein the semi-static metrics further include any one of an interference metric and an air-time link metric.

3. The method of claim 1 wherein the instantaneous metrics include any one of a buffer status metric and a link capacity metric.

4. The method of claim 3 wherein the buffer status metric includes information relating to a buffer occupancy of at least one intermediate node between the first node and the destination node.

5. The method of claim 1 wherein the feedback includes a quality of service (QoS) supported on each of the multiple candidate paths across the wireless directional mesh network.

6. A method for joint routing and distributed scheduling in a wireless directional mesh network, implemented in a first node of the wireless directional mesh network, comprising:

receiving feedback for multiple candidate paths across the wireless directional mesh network from at least one neighbor node, the feedback including a quality of service (QoS) supported on each of the multiple candidate paths across the wireless directional mesh network;

determining semi-static metrics based upon the received feedback, including at least a path diversity metric that includes a connectivity of an intermediate node to the destination node, and any one of an interference metric or an air-time link metric;

determining instantaneous metrics based upon the received feedback, including any one of a buffer status metric or a link capacity metric;

determining routing from the first node to a destination node based upon the semi-static and instantaneous metrics, and an explicitly determined back-pressure, wherein the semi-static metric includes information relating to a node creating interference and a power level of the interference; and routing a transmission in accordance with the determined route from the first node to the destination node across the wireless directional mesh network.

7. A first node in a mesh network, the node comprising:
a receiver;
a transmitter; and
a processor in communication with the receiver and the transmitter, the processor, receiver, and transmitter, configured to receive feedback for multiple candidate paths across the wireless directional mesh network from at least one neighbor node, determine semi-static and instantaneous metrics based upon the received feedback, wherein the semi-static metrics include at least a path diversity metric that includes a connectivity of an intermediate node to the destination node, determine routing from the first node to a destination node based upon the semi-static and instantaneous metrics, and a back-pressure, wherein the back-pressure is determined explicitly and wherein the semi-static metric includes information relating to a node creating interference and a power level of the interference, and;

route a transmission in accordance with the determined route from the first node to the destination node across the wireless directional mesh network.

8. The first node of claim 7 wherein the semi-static metrics further include any one of an interference metric or an air-time link metric.

9. The first node of claim 7 wherein the instantaneous metrics include any one of a buffer status metric or a link capacity metric.

10. The first node of claim 9 wherein the buffer status metric includes information relating to a buffer occupancy of at least one intermediate node between the first node and the destination node.

11. The first node of claim 7 wherein the feedback includes a quality of service (QoS) supported on each of the multiple candidate paths across the wireless directional mesh network.

* * * * *